US011448832B2

(12) United States Patent
Simmons et al.

(10) Patent No.: US 11,448,832 B2
(45) Date of Patent: Sep. 20, 2022

(54) OPTICAL FIBER CONNECTION SYSTEM

(71) Applicant: 3M INNOVATIVE PROPERTIES COMPANY, St. Paul, MN (US)

(72) Inventors: Richard L. Simmons, Austin, TX (US); Nathaniel S. Shonkwiler, Austin, TX (US); Donald K. Larson, Cedar Park, TX (US); William J. Clatanoff, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 88 days.

(21) Appl. No.: 16/754,062

(22) PCT Filed: Oct. 15, 2018

(86) PCT No.: PCT/IB2018/057978
§ 371 (c)(1),
(2) Date: Apr. 6, 2020

(87) PCT Pub. No.: WO2019/077471
PCT Pub. Date: Apr. 25, 2019

(65) Prior Publication Data
US 2020/0326485 A1 Oct. 15, 2020

Related U.S. Application Data
(60) Provisional application No. 62/573,941, filed on Oct. 18, 2017.

(51) Int. Cl.
*G02B 6/38* (2006.01)
*G02B 6/36* (2006.01)
(52) U.S. Cl.
CPC ......... *G02B 6/3809* (2013.01); *G02B 6/3636* (2013.01); *G02B 6/3821* (2013.01); *G02B 6/3839* (2013.01); *G02B 6/3885* (2013.01)

(58) Field of Classification Search
CPC .. G02B 6/3809; G02B 6/3636; G02B 6/3821; G02B 6/3839; G02B 6/3885; G02B 6/38
See application file for complete search history.

(56) References Cited

U.S. PATENT DOCUMENTS 3,810,802 A   5/1974 Buhite
3,864,018 A   2/1975 Miller
(Continued)

FOREIGN PATENT DOCUMENTS

AU   200178275   1/2002
EP   0927897     7/1999
(Continued)

OTHER PUBLICATIONS

International Search report for PCT International Application No. PCT/IB2018/057978 dated Jan. 30, 2019, 6 pages.

*Primary Examiner* — Jennifer Doan
(74) *Attorney, Agent, or Firm* — Jonathan L. Tolstedt

(57) ABSTRACT

An optical fiber connection system (100) for connecting a plurality of optical fibers is described. The connection system comprises a first bare fiber holder (120) comprising a first splice element (160) and a second bare fiber holder (120') comprising a second splice element (160'). Each of the first and second splice elements (160,160') comprises a splice body (161) having a first end (160*a*) and a second end (160*b*) and a plurality of alternating alignment and clamping channels (165,167) formed in a top surface (161*b*) of the splice body (161) that extend from the first end to the second end of the splice body. When the first and second bare fiber holders (120,120') are mated, at least a portion of the alignment channels (165) of the first splice element (160) overlap a portion of the clamping channels (167) in the second splice element (160') and at least a portion of the clamping channels (167) of the first splice element (160) overlap a portion of the alignment channels (165) of the (Continued)

second splice element (160') to hold the first and second optical fibers in end to end alignment.

10 Claims, 23 Drawing Sheets

(56) References Cited

U.S. PATENT DOCUMENTS

| | | |
|---|---|---|
| 3,919,037 A | 11/1975 | Miller |
| 4,046,454 A | 9/1977 | Pugh, III |
| 4,148,559 A | 4/1979 | Gauthier |
| 4,227,951 A | 10/1980 | Mignien |
| 4,580,874 A | 4/1986 | Winter |
| 4,662,713 A | 5/1987 | Davies |
| 4,717,233 A | 1/1988 | Szkaradnik |
| 4,973,126 A | 11/1990 | Degani |
| 5,042,902 A | 8/1991 | Huebscher |
| 5,381,498 A | 1/1995 | Bylander |
| 5,732,174 A | 3/1998 | Carpenter |
| 5,757,997 A | 5/1998 | Birrell |
| 6,151,433 A | 11/2000 | Dower |
| 6,331,080 B1 | 12/2001 | Cole |
| 6,758,600 B2 | 7/2004 | Del Grosso |
| 6,869,227 B2 | 3/2005 | Del Grosso |
| 9,791,635 B2 | 10/2017 | Richmond |
| 2003/0174998 A1* | 9/2003 | Shevchuk ............ G02B 6/3878 385/137 |
| 2006/0159402 A1* | 7/2006 | Ammer ................ G02B 6/3809 385/71 |

FOREIGN PATENT DOCUMENTS

| | | |
|---|---|---|
| EP | 1039322 | 9/2000 |
| EP | 1184695 | 3/2002 |
| WO | WO 2018-045383 | 3/2002 |
| WO | WO 2015-009811 | 1/2015 |
| WO | WO 2017-063106 | 4/2017 |
| WO | WO 2018-044565 | 3/2018 |
| WO | WO 2018-045382 | 3/2018 |
| WO | WO 2018-052777 | 3/2018 |
| WO | WO 2019-030635 | 2/2019 |
| WO | WO 2019-077470 | 4/2019 |
| WO | WO 2019-077472 | 4/2019 |

* cited by examiner

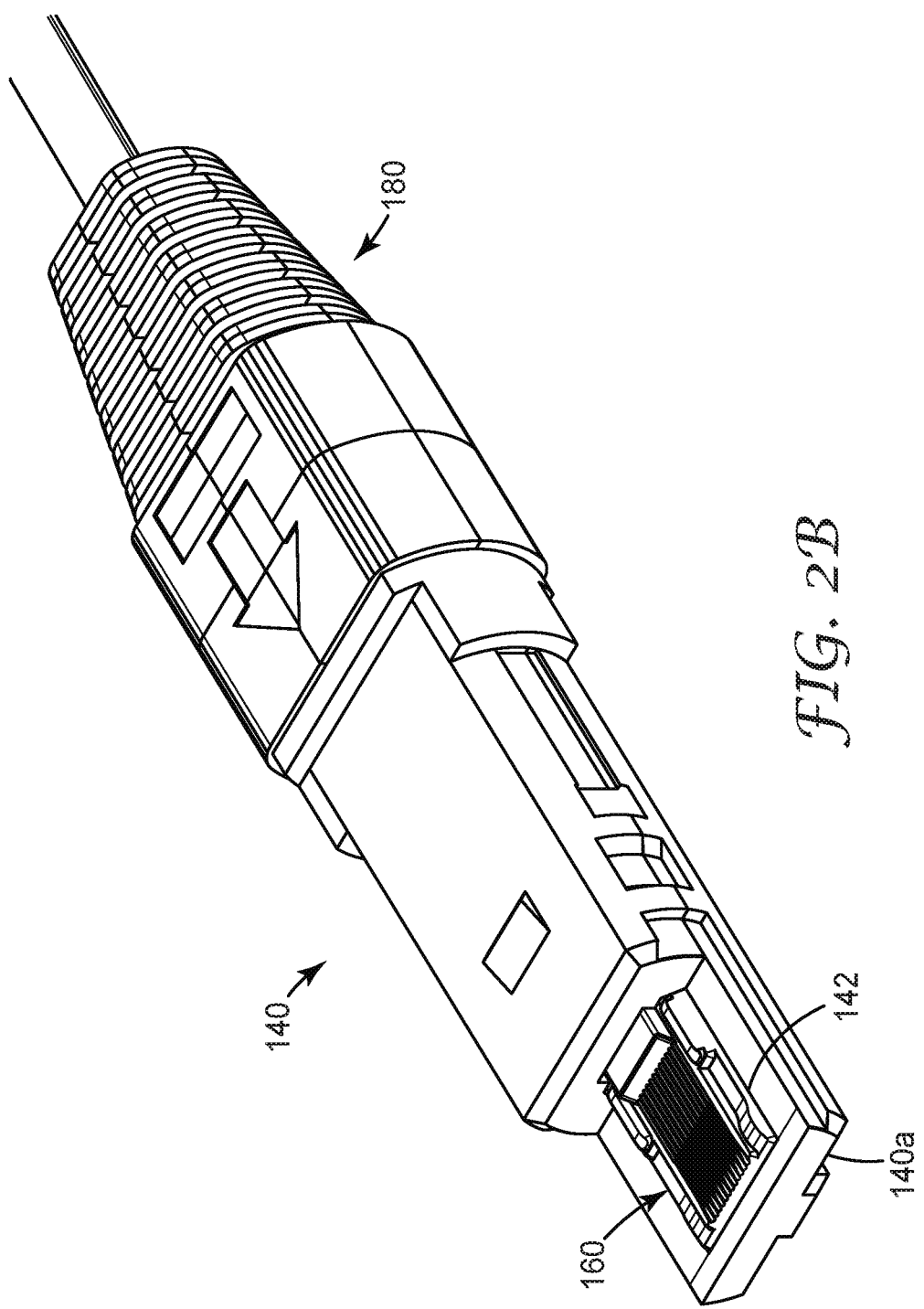

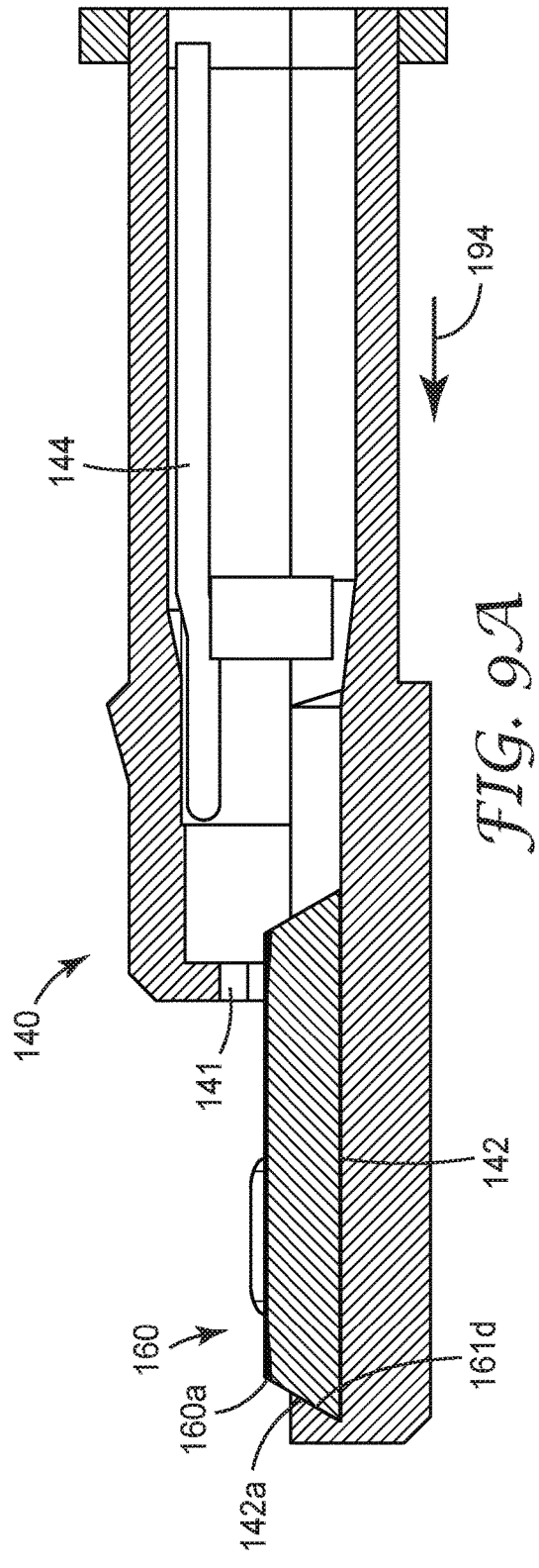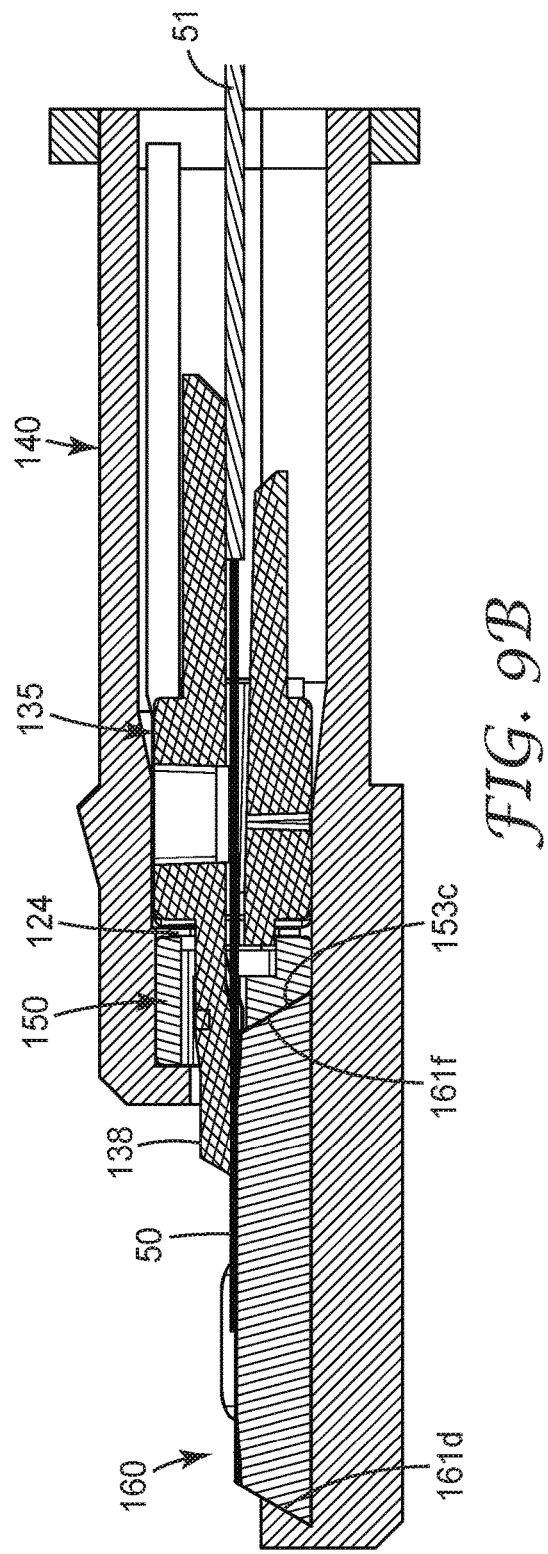

OPTICAL FIBER CONNECTION SYSTEM

BACKGROUND

Field of the Invention

The present invention is directed to an optical fiber connections system to interconnect a plurality of first and second plurality of optical fibers.

Related Art

Communication network owners and operators are faced with increasing demands to deliver faster and better service to their customers. They can meet these needs for greater bandwidth by incorporating fiber optics in their networks. Optical fiber cables are used in the optical network to transmit signals between access nodes to transmit voice, video, and data information.

Some conventional optical fiber cables include optical fiber ribbons that includes a coated group of optical fibers that are arranged in a planar array. Optical fibers in the ribbon are generally disposed generally parallel to each other. Optical fiber ribbons are typically interconnected using multi-fiber optical connectors, for example, MPO/MTP connectors which can be used in data centers or other points in the network where parallel optical interconnections are needed.

Data centers rely on 10G and 40G transmission rates which are relatively mature technologies. The global data center Internet protocol (IP) traffic is anticipated to grow by about 31 percent annually within the next five years due to changes in the way people are using Internet. Cloud computing, mobile devices, access video and social media content around the globe are driving data centers to migrate from 10G and 40G transmission rates to 100G and 400G transmission rates.

Data centers are moving toward 40G/100G transmission rates which utilize multiple parallel network links that are then aggregated to achieve higher overall data rates. Polarity in fiber optic cabling is essentially the matching of the transmit signal (Tx) to the receive equipment (Rx) at both ends of the fiber optic link by providing transmit-to-receive connections across the entire fiber optic system. Polarity is managed by use of transmit and receive pairs (duplex cabling), but becomes more complex with multi-fiber connectivity which support multiple duplex pairs such as MPO/MTP connectors.

Higher bandwidth links will require more power to assure signal transmission integrity. Today, heat dissipation from the electronics is already a concern and increasing the power further will amplify the issues that data centers are already facing. This increasing need for more power as well as the desire to install future flexible structured cabling systems is driving interconnection performance to low loss performance (less than 0.1 dB per connection point).

Conventional single fiber ferrule type connectors offer easy reconfiguration, but have the drawback of high optical loss (0.2-0.3 dB) and even higher loss for multi-fiber ferruled connectors such as MPO/MTO connectors (0.35-0.7 dB). Ferruled connectors must be cleaned every time that they are mated. In addition, space required for ferruled connectors limits the interconnection density.

Fusion splicing is another conventional interconnection method, which creates low loss permanent reliable splices. However, handling 250 micron fiber during preparation, fuse, storage can be troublesome. Today, such fusion splices typically require their own splice rack in the data center.

Finally, traditional gel type mechanical splices offer permanent and reliable fiber slices with insertion loss better than connectors and approaching that of fusion splices. However, these mechanical splices employ index matching gels which are not solid materials and therefore, provide no structural integrity.

Thus, need exists for new multi-fiber interconnect technology that offer "fusion-like" optical performance to facilitate datacenter bandwidth migration from 10G and 40G transmission rates, today, to tomorrow's 100G and 400G transmission rates.

SUMMARY

According to an embodiment of the present invention, splice element for use in an optical fiber connection system is described which is configured to interconnect a plurality of first and second optical fibers. The splice element comprises a splice body having a plurality of alternating alignment and clamping channels formed in a top surface of splice body, wherein the alignment channels include sloped channel walls, wherein each of the sloped channel walls touches the optical fibers along a line of contact and wherein the clamping channel is configured to contact the optical fibers disposed therein along the bottom wall of the clamping channel.

According to an embodiment of the present invention, an optical fiber connection system configured to interconnect a plurality of first and second optical fibers is described herein. The connection system comprises a first bare fiber holder comprising a first splice element and a second bare fiber holder comprising a second splice element. Each of the first and second splice elements comprises a splice body having a first end and a second end and a plurality of alternating alignment and clamping channels formed in a top surface of splice body that extend from the first end to the second end of the splice body. When the first and second bare fiber holders are mated, at least a portion of the alignment channels of the first spice element overlap a portion of the clamping channels in the second splice element and at least a portion of the clamping channels of the first splice element overlap a portion of the alignment channels of the second splice element to hold the first and second optical fibers in end to end alignment.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 2A-2C are three views of a first bare fiber holder according to an aspect of the invention.

FIGS. 9A and 9B are two cross-sectional views of a partially assembled first housing portion of the fiber holder shown in FIGS. 2A-2C.

Figure 1:
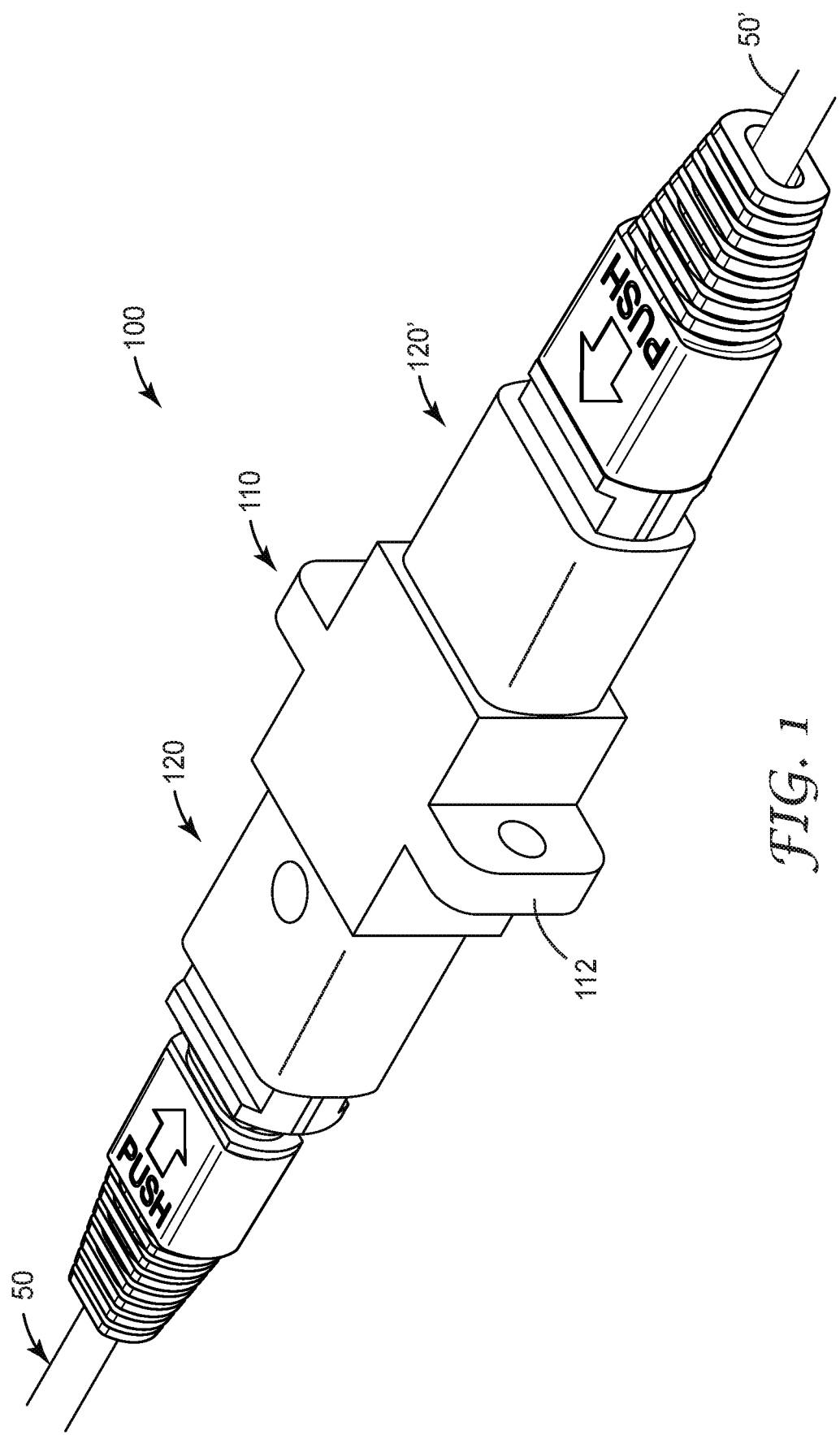
FIG. 1 is an isometric view of an optical fiber splice connection system according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

Figure 2A:
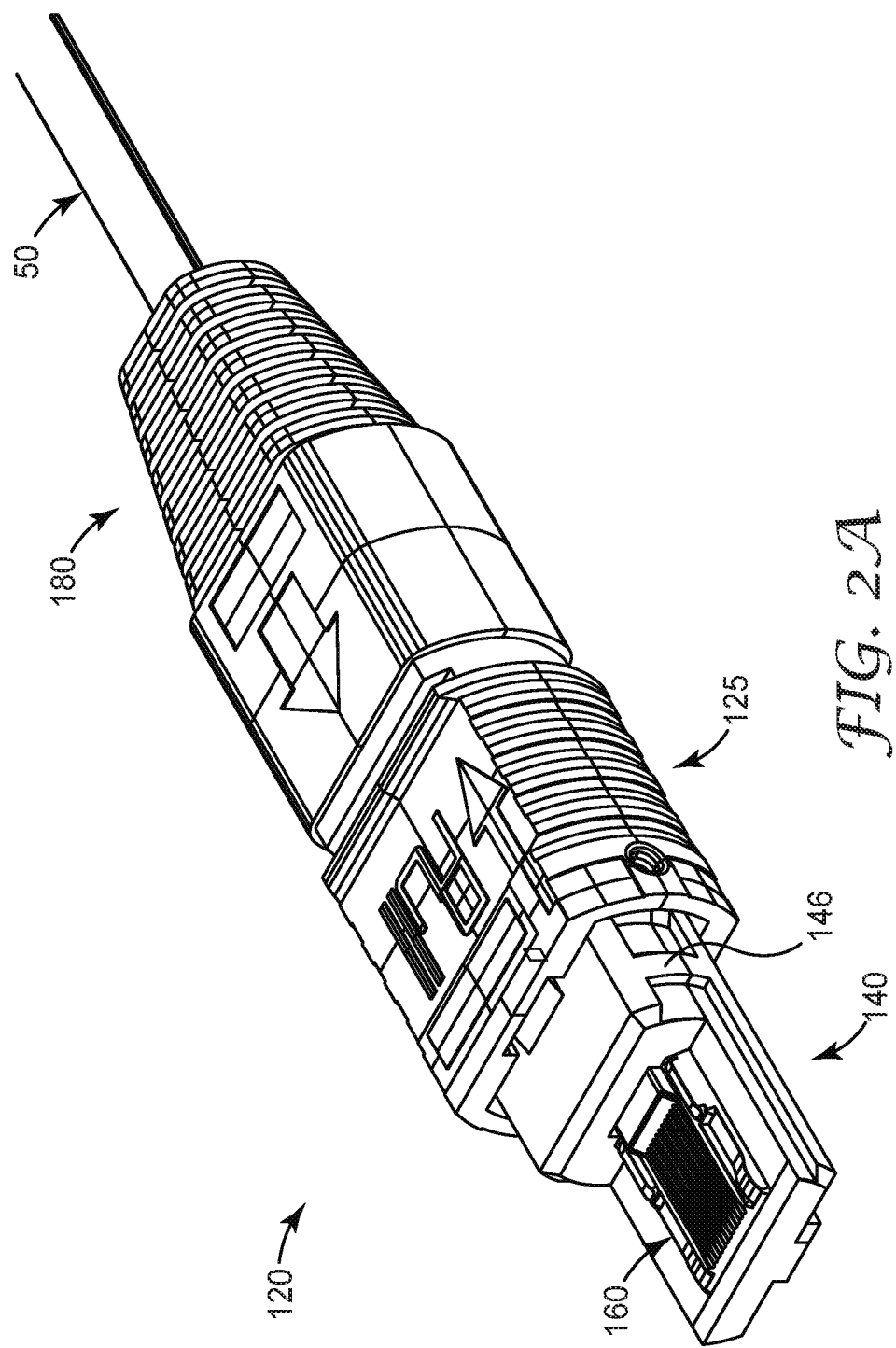

FIG. 1 shows an optical fiber splice connection system 100 that provides a ferrule-less interconnection system to optically couple a plurality of first and second optical fibers. Optical fiber splice connection system 100 comprises first and second bare fiber holders 120, 120'. First and second bare fiber holders 120, 120' can be secured together by a clamping member 110 in the form of a clamping sleeve as shown. The clamping sleeve is a generally tubular structure having a passage way extending therethrough and a means for securing the bare fiber holders within the sleeve. The passage way is sized to secure the first and second fiber holders together when in their mated condition. In an exemplary aspect, the securing means can include a pair of latch arms (not shown) disposed on opposite sides of the passageway at each end of the sleeve. The latch arms on the clamping sleeve can be configured to mate with a catch 146 disposed on a front or second housing portion 140 of each of the first and second bare fiber holders (FIG. 2A). Optionally, clamping member 110 can include a connection flange (such as flange 112) extending from the external surface of the clamping member to secure the clamping member in a bulkhead, face plate or wall of an enclosure, module, cassette or patch panel. Each of the first and second bare fiber holders 120, 120' can comprises a release collar 125 that can be pulled away from the clamping member allowing the latch arms to be released so that the bare fiber holders may be released from the clamping member. In an alternative embodiment, the bare fiber holders may be permanently connected within the clamping member such as by an adhesive.

Bare fiber holders 120, 120', according to the current invention, manage and protect a fiber array of one or more optical fibers having an exposed glass portion adjacent to the end face or terminal end of the optical fiber(s). In other words, the polymer coatings have been removed from at least a portion of the optical fiber(s) circumferential diameter to facilitate alignment during mating a pair of bare fiber holders to optically interconnect the fiber arrays held by said bare fiber holders.

In an exemplary aspect, optical fiber splice connection system 100 includes first and second bare fiber holders 120, 120' that can be field terminated or installed or mounted onto an optical fiber cable or fiber ribbon in the field followed by assembly of the first and second bare fiber holders to form either a semi-permanent or permanent optical connection. Alternatively, the first and second bare fiber holders can be factory terminated or installed or mounted onto an optical fiber cable or fiber ribbon in the factory followed by assembly of the first and second bare fiber holders to form either a semi-permanent or permanent optical connection in the field.

In an exemplary aspect, the bare fiber holders can be configured to resemble the look and feel of an MPO or MTP optical fiber connector, while at the same time providing the enhanced signal performance and in some embodiments permanence of an optical fiber splice.

Optical fiber splice connection system 100 is configured as a multi-fiber optical splice connection system. In the exemplary embodiments described herein, the optical fiber splice connection system is configured to connect first and second arrays of optical fibers. In the exemplary embodiment provided herein, the optical fiber splice connection system is configured to connect two 12 fiber arrays. As would be apparent to one of ordinary skill in the art given the present description, optical fiber splice connection system 100 can be modified to include fewer optical fibers or a greater number of optical fibers in each fiber array.

Figure 2C:
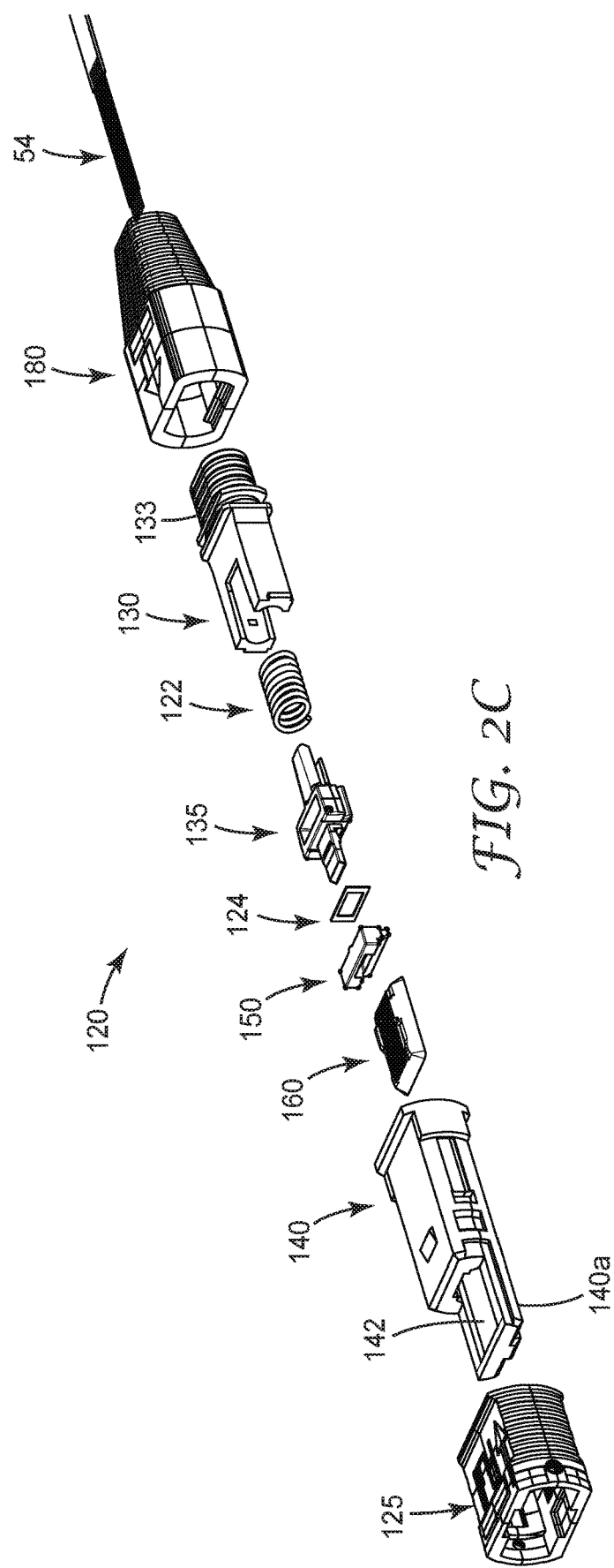

FIG. 2A shows first bare fiber holder 120 in an assembled state; FIG. 2B shows the first bare fiber holder without its release collar 125; and FIG. 2C shows an exploded view of the first bare fiber holder showing the bare fiber holder's internal components. The first bare fiber holder 120 has a first housing portion 130 and a second housing portion 140 that can be secured together to form the holder housing configured to arrange and hold the rest of the elements of the fiber holder. In an exemplary aspect, at least a portion of first housing portion can be inserted into a portion of the second housing portion to secure the two housing portions together.

Figure 7A:
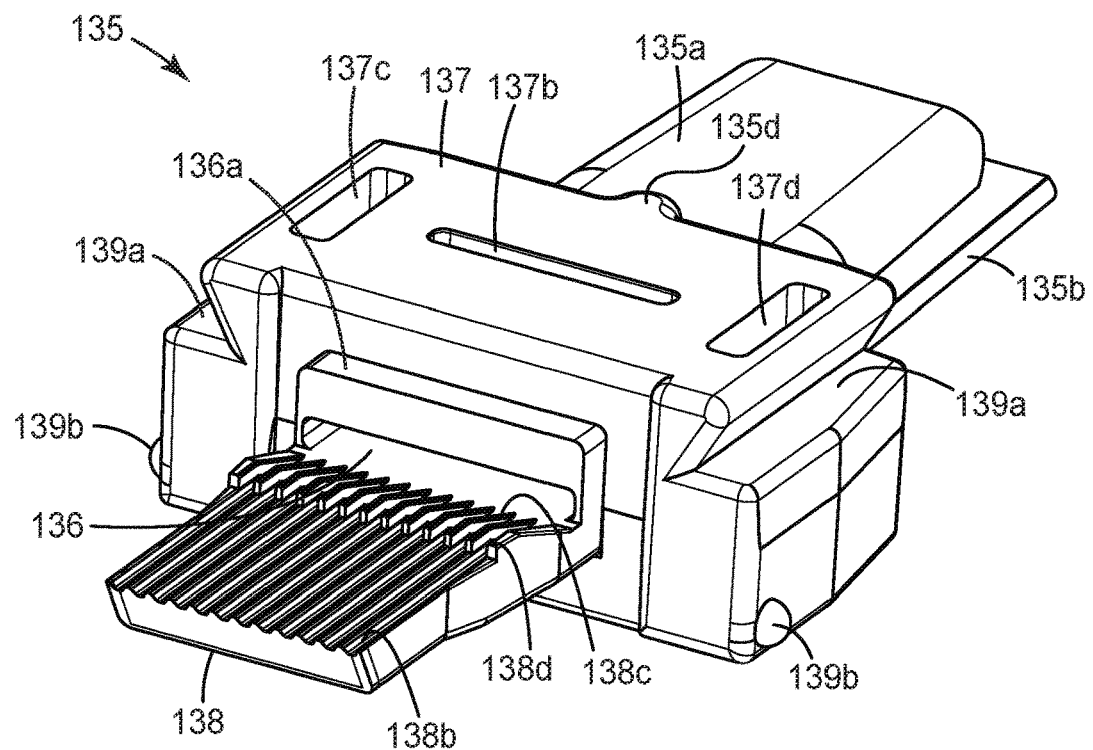
FIGS. 7A-7D are four views of an exemplary fiber organizer of the bare fiber holders according to an aspect of the invention.
Figure 7B:
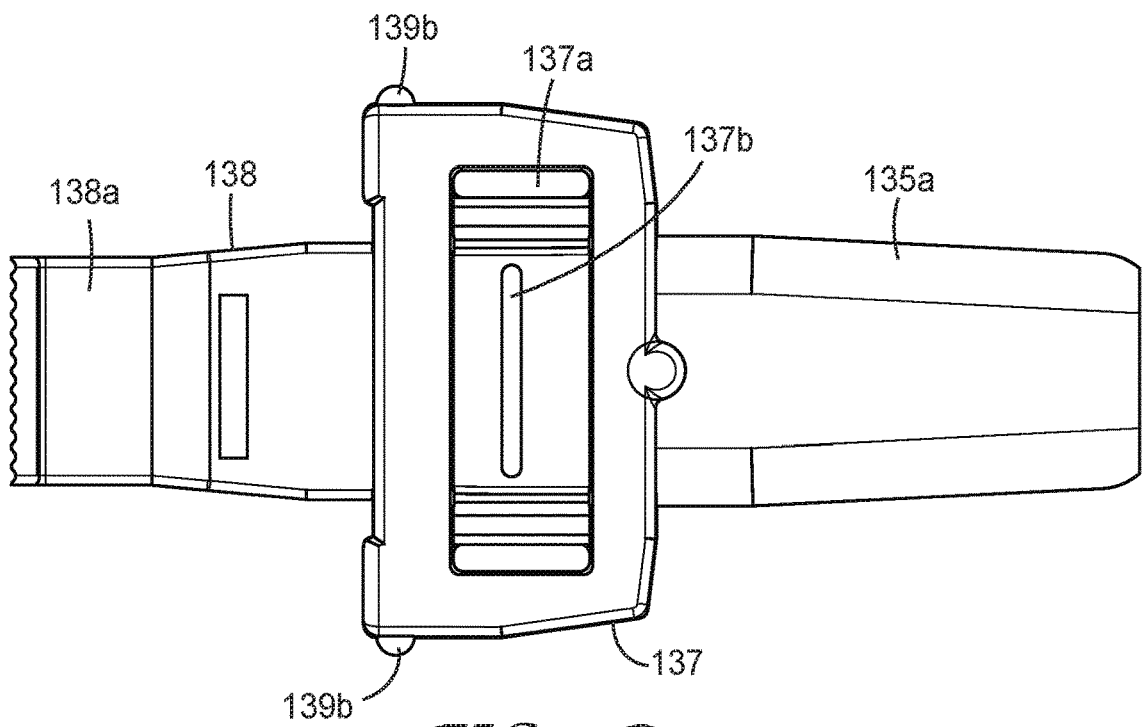
Figure 7C:
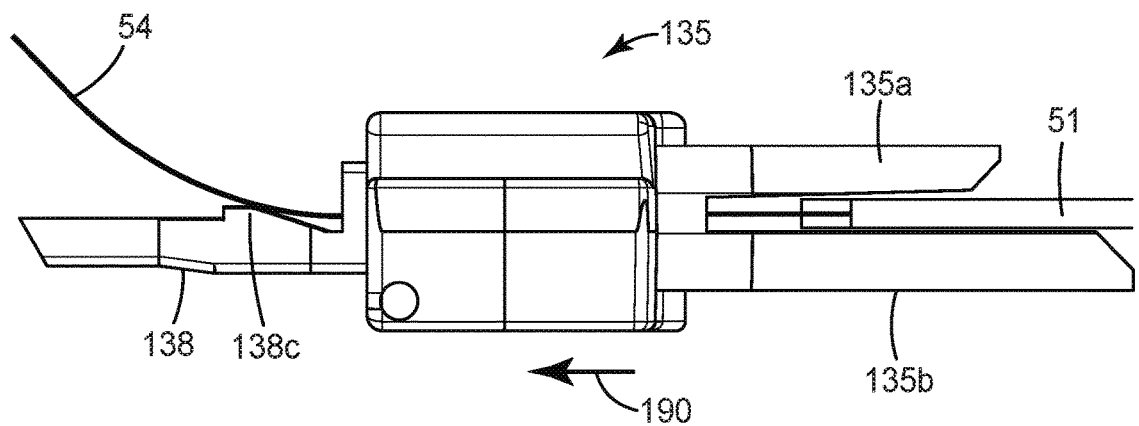
Figure 7D:
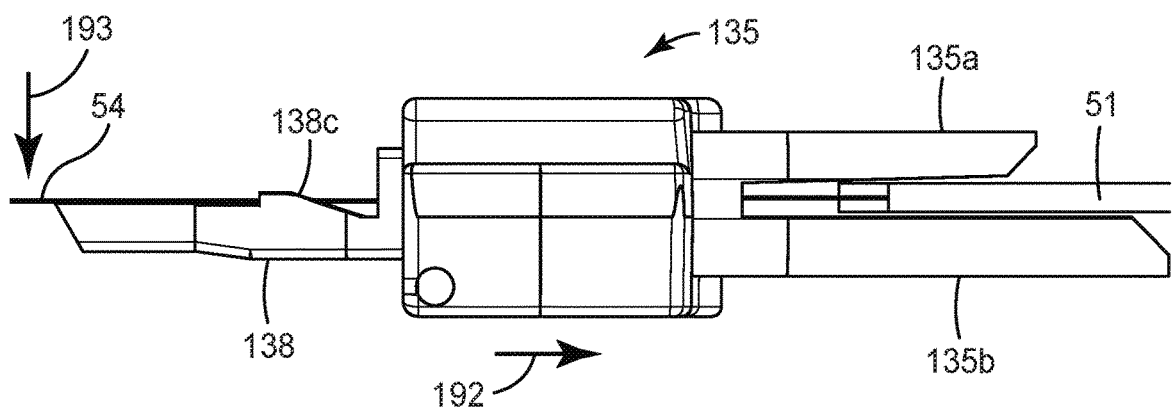

A fiber alignment mechanism or splice element 160 is a precision element that is disposed in an element receiving pocket 142 adjacent to a first end of the second housing portion. A blocking element 150 is disposed behind splice element 160 within the internal cavity of the second housing potion which pushes on the element to ensure that it is properly positioned within the bare fiber holder. A fiber organizer 135 is disposed between the blocking element and first housing portion. The fiber organizer helps reduce the complexity of assembling the bare fiber holders onto the end of a fiber cable or fiber ribbon comprising a plurality of optical fibers. The fiber organizer includes a fiber comb structure 138 that provides a straightforward mechanism to simultaneously feed the plurality of optical fibers into alignment channels in a surface of the splice element of the first and second bare fiber holders, as shown in FIG. 7A.

Figure 6A:
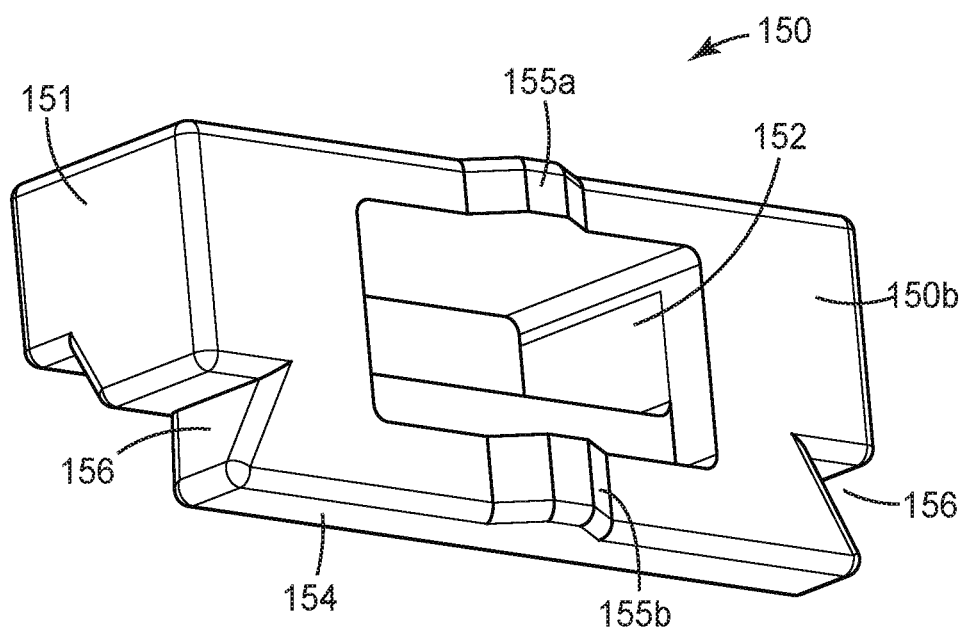
FIGS. 6A-6B are two views of a blocking element according to an aspect of the invention.
Figure 6B:
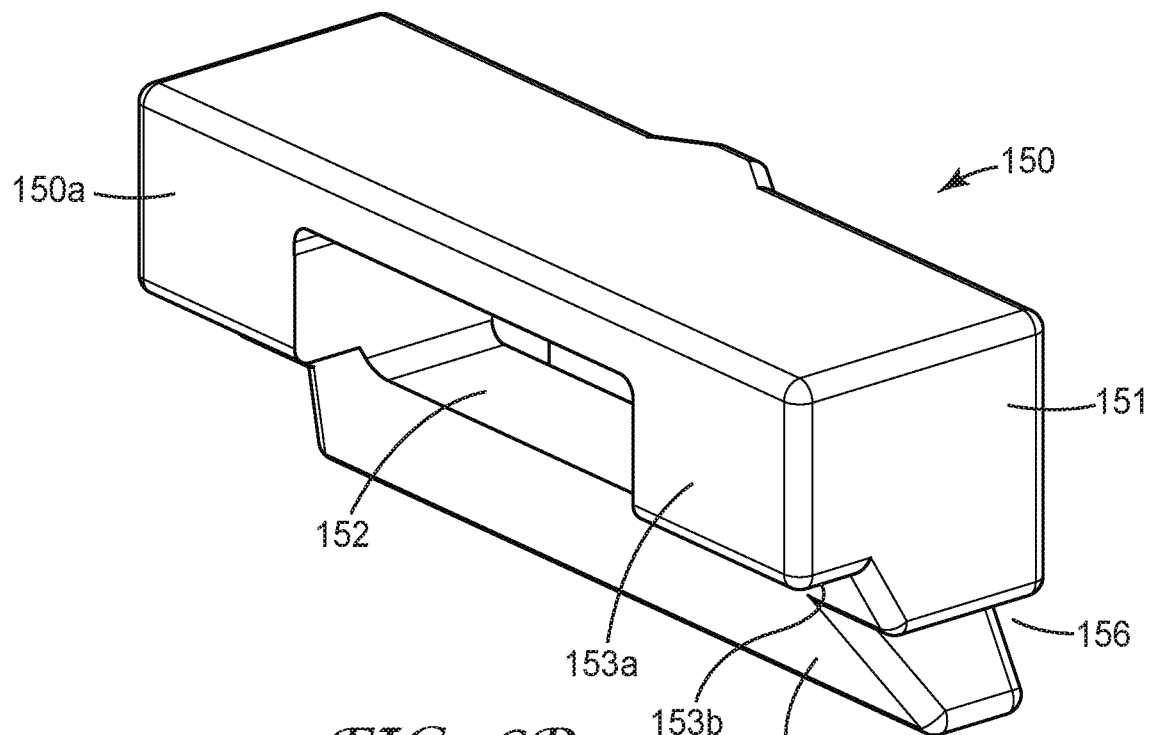

A first intermediate spring element 124 can be disposed between a front portion of the fiber organizer and the blocking element to help control the force placed on the fiber ends when they are connected. Intermediate spring 124 can be a small spring element, such as a flat or leaf spring that is seated on a shelf or shoulder portion 136a disposed around the opening of passage 136 through the body 137 of the fiber organizer 135 (see e.g., FIG. 7A). In one aspect, the intermediate spring can provide a countering force to dampen the force placed on the mated fibers. As shown in FIGS. 6A-6B, the blocking element 150 includes a pair of protrusions or bumps 155a, 155b located on a rear portion thereof that provides a point of contact with the intermediate spring and helps center the force applied by the intermediate spring element. The intermediate spring element enables a desired ratio of spring forces to be applied to the fibers being terminated and helps balance the forces within the bare fiber holder.

The actual force applied to the end of the fiber array can be controlled by tuning the compressive force of intermediate spring 124 and a compression spring 122 disposed between the fiber organizer 135 and the first housing portion 130 to create a variable resulting force on the fiber array. By using this configuration, the multi-fiber splice device(s) of the present invention can utilize the spring forces of the fiber array, the intermediate spring and the main compression spring to achieve a force balance.

In one exemplary aspect, this force balancing can be used to enable the exemplary remote grip bare fiber holders to be used to create a reliable dry splice interface (no optical coupling material or index matching gel or adhesive) in the optical path in conjunction with fiber end face shaping techniques known in the industry. For example, putting a spherical end face shape onto the fiber can eliminate the need for index matching material in the splice region and yield an insertion loss of less than 0.5 dB.

Figure 3A:
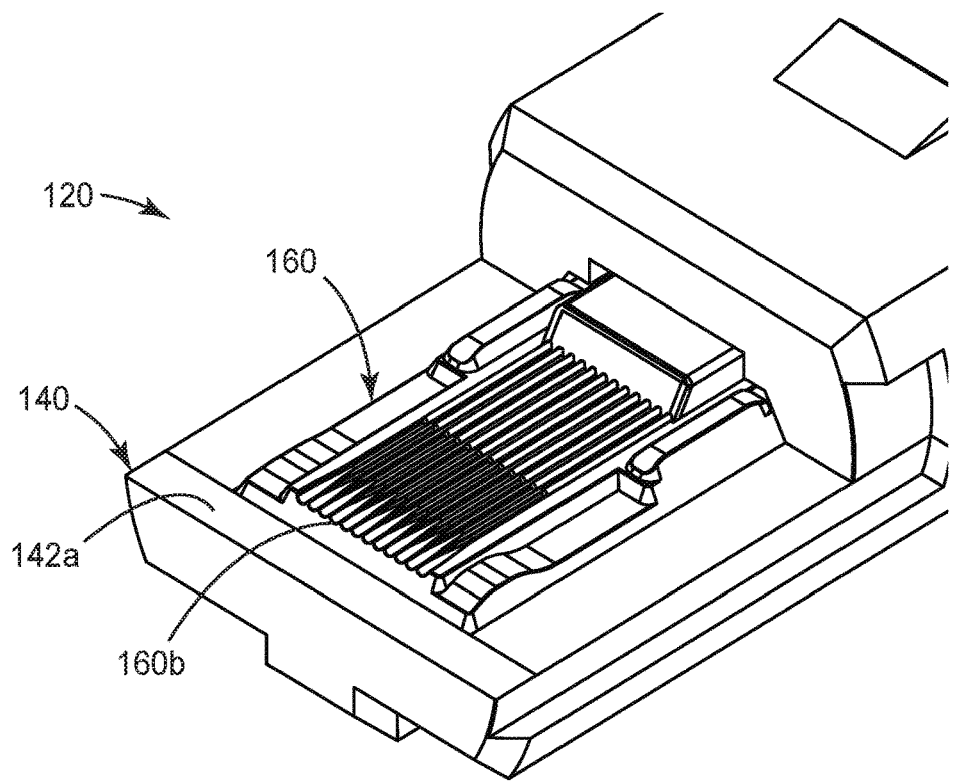
FIGS. 3A and 3B are two detail views showing splice element orientation in the first and second bare fiber holders according to an aspect of the invention.
Figure 3B:
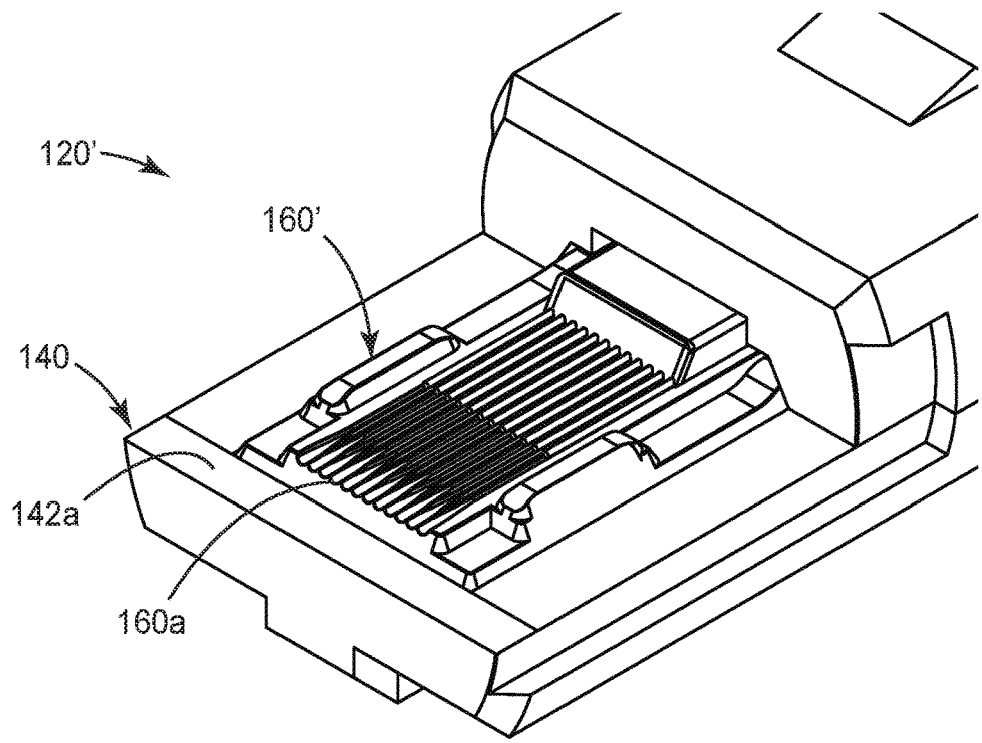

In a first embodiment, optical fiber connection system utilizes a pair of splice elements held by the first and second bare fiber holders 120, 120'. The structure of the first and second bare fiber holders is essentially the same apart from the orientation of the splice element 160 within an element receiving pocket 142 adjacent to a first end of the second housing portion 140 as shown in FIGS. 3A and 3B as will be describe below.

Figure 4A:
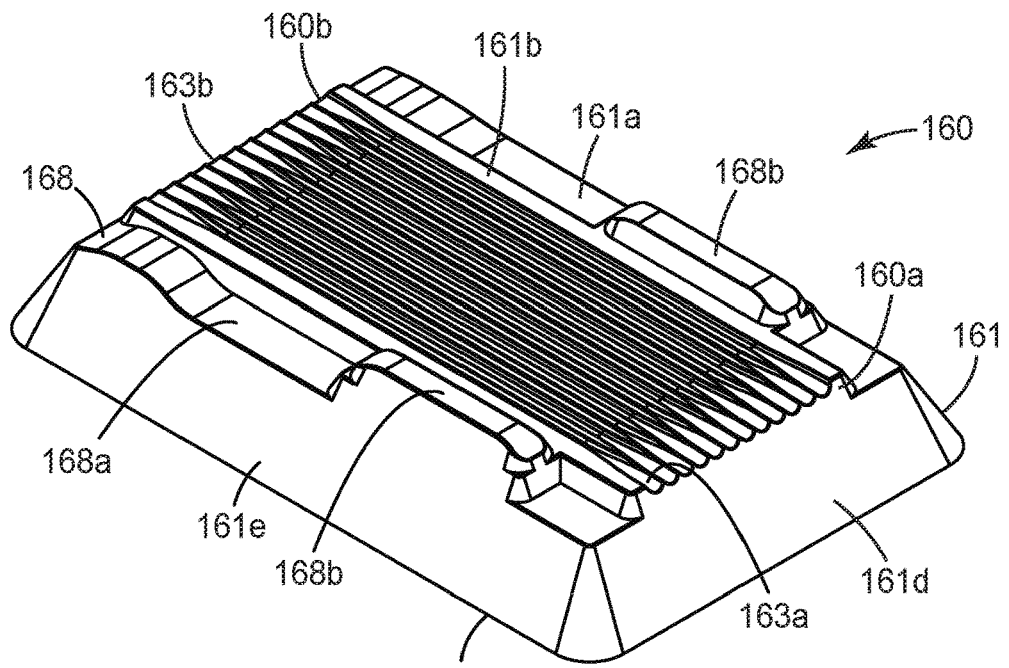
FIG. 4A-4C are three views of an exemplary splice element useable in the fiber holder of FIGS. 2A-2C.
Figure 4B:
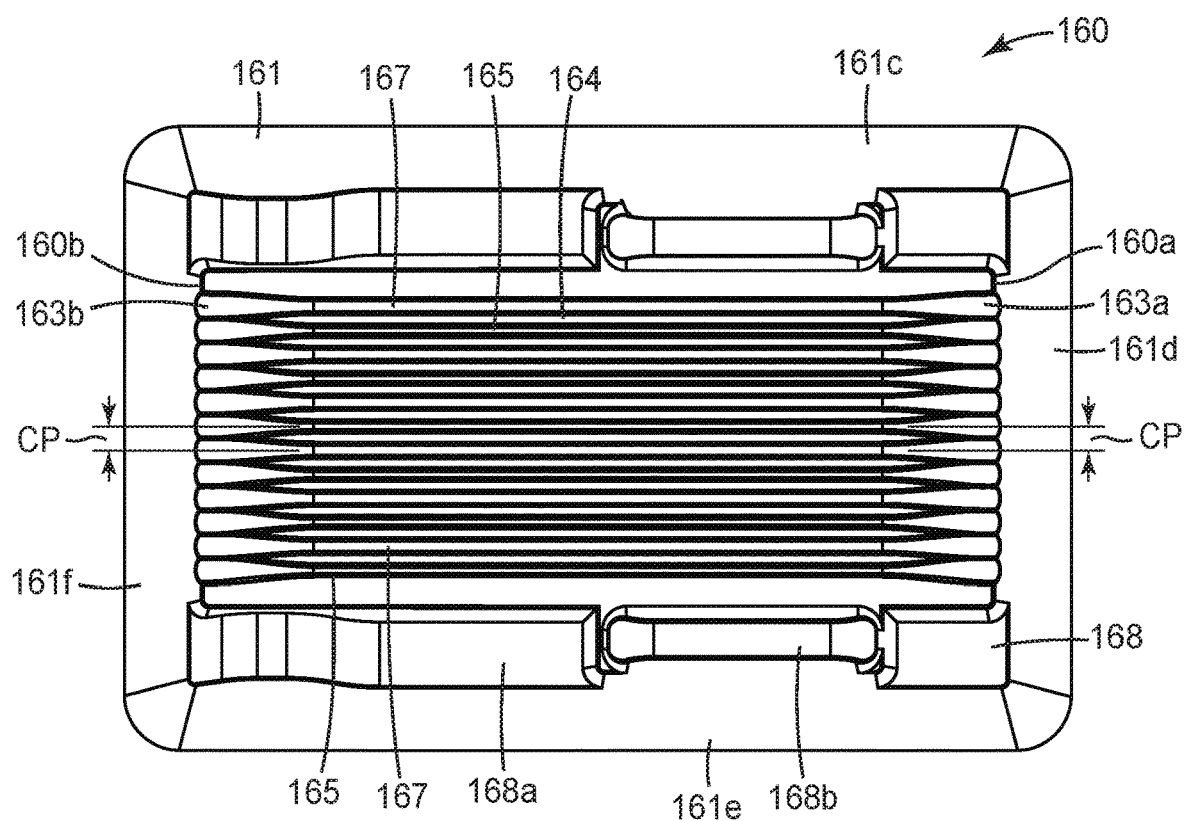
Figure 4C:
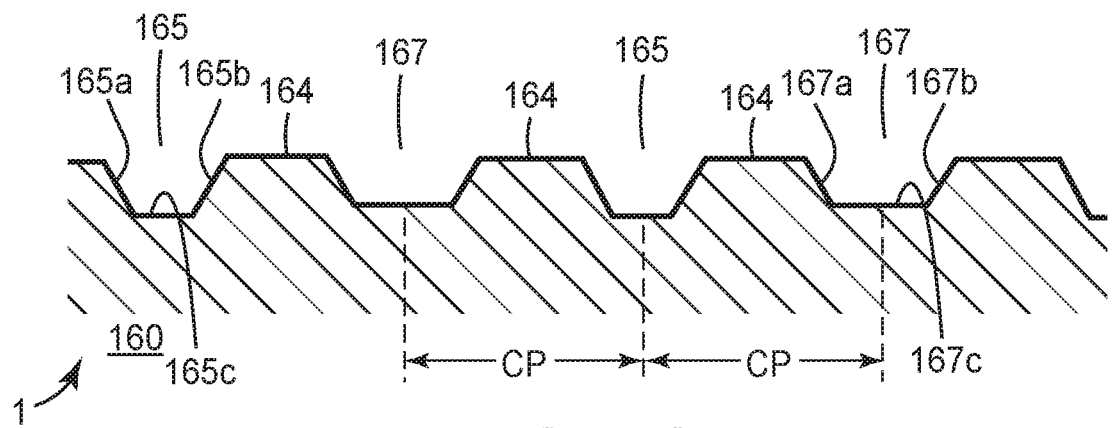
Figure 5:
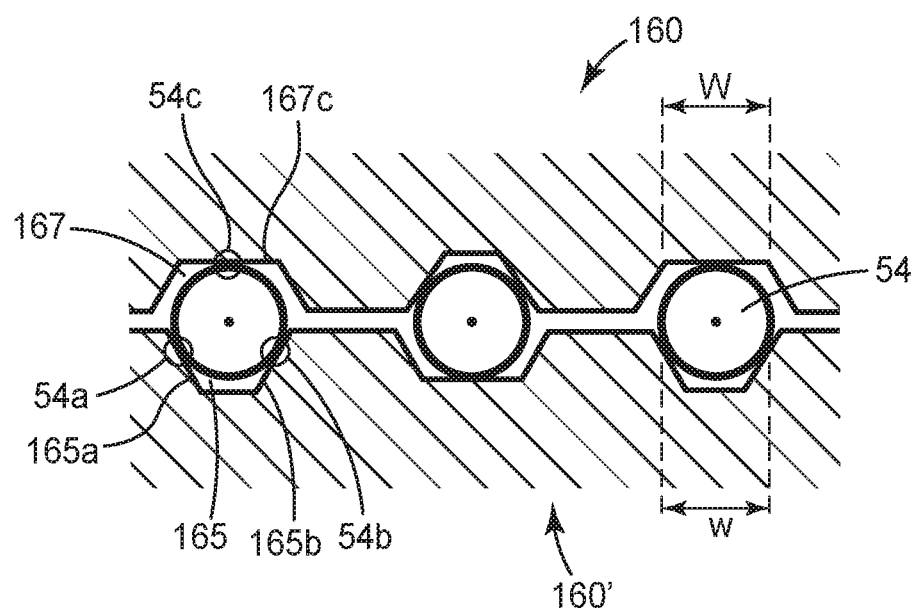
FIG. 5 is a schematic diagram showing a plurality of optical fibers being held between two mated splice elements of the embodiment shown in FIGS. 4A-4C.

FIGS. 4A-4C show an exemplary splice element 160 that is configured to join a plurality of parallel optical fibers 54 of first and second optical fiber ribbons 50 when mated with another slice element 160' as shown in FIG. 5. Splice elements 160, 160' are structurally equivalent, but are rotated with respect to one another when mated.

Splice element 160 has a generally rectangular body 161. In an exemplary aspect, the shape of the body 161 is a rectangular frustum. In alternative aspects, the body may have another shape such as a trapezoidal prism, semi-cylindrical solid, bisected prism or other three-dimensional shape having at least one generally flat major surface. The body 161 has a bottom surface 161a, a smaller top surface 161b and four sloped side walls 161c-161f extending from the bottom surface to the top surface. In an exemplary aspect, the side walls are sloped at an angle between about 45° and about 85°, preferably at an angle of about 60° relative to the bottom surface.

Splice element 160 has an integral alignment and clamping mechanism in the form of a plurality of alternating alignment and clamping channels 165, 167, respectively, formed in the top surface 161b of body 161. The alternating alignment and clamping channels extend from the first end 160a to the second end 160b of the body. Each alignment channel is configured to guide and support a single optical fiber and the clamping channels are configured to press on an optical fiber held in an alignment channel in a second splice element when two splice elements 160 are mated together. In the exemplary embodiment shown in FIG. 4A, the splice element has 12 parallel channels comprising 6 alignment channels and 6 clamping channels. In alternative embodiments, the exemplary optical fiber slice element can have fewer or more alignment and clamping channels depending on the final application and the number of optical fibers to be spliced. Thus, in some embodiments, the splice element can have two parallel channels (i.e. one alignment channel and one clamping channel) for joining a pair of duplex optical fiber cables. In other embodiments, the exemplary splice element can have a larger number of channels (e.g. the number of channels can be 16, 24, 32, etc.) so long as the splice element has an equal number of alternating alignment and clamping channels. In an alternative embodiment, the exemplary splice element can have alternating sets of alignment and clamping channels, wherein each set comprises a plurality of like channels.

Alignment channels 165 and the clamping channels 167 can be substantially flat or planar as they extend from the first and second ends of the splice element. In the exemplary embodiment shown in FIGS. 4A-4B, the alignment and clamping channels are continuous structures extending from the first entrance opening 163a at the first end 160a of splice body 161 to the second entrance opening 163b at the second end 160b of splice body 161. The alignment channels and the clamping channels can have a characteristic cross-section, such as the trapezoidal profile shown in FIG. 4C. Alternatively, alignment channels and the clamping channels can have a semi-circular cross section, a rectangular cross section, a v-shaped cross section.

The fibers can be inserted into the alignment mechanism through entrance openings 163a and 163b. In some aspects, the entrance openings 163a, 163b can comprise a funneling inlet portion formed by the tapering of the partitions 164 between adjacent channels to provide for more straightforward fiber insertion. In other embodiments, the entrance apertures can be fully or partially cone or funnel-shaped to guide the insertion of the optical fibers into the alignment channels 165.

The entrance openings 163a, 163b are characterized by an interchannel pitch CP (i.e. the distance between the centerline of adjacent alignment channels). In the embodiment, shown in FIG. 4C, the channel pitch at the first end of the splice element is the same as the channel pitch at the second end of the splice element. In this exemplary embodiment, the interchannel pitch is approximately the same as the inter-fiber spacing in a conventional 12 fiber ribbon. In an alternative embodiment, the interchannel pitch at the first end of the splice element and the channel pitch at the second end of the splice element can be different. For example, the channel pitch at the first end of the splice element can be set to the fiber spacing of a conventional optical fiber ribbon, while the channel pitch at the second end of the splice element can be at a different value such as when splicing individual optical fibers or when splicing two or more smaller optical fiber ribbon ribbons or optical fiber modules to a larger ribbon fiber.

In the exemplary embodiment shown in FIGS. 4A-4C, while the inter channel pitch is uniform across splice element 160, the width of the alignment channels and the clamping channels is different. The alignment channels are configured such that a fiber disposed in the alignment channel will contact each of the sloped channel walls 165a, 165b of the alignment channel along a line of contact 54a, 54b disappearing into the page in FIG. 5 along the length of the fiber disposed within the alignment channel, while the clamping channels 167 are configured such that a fiber disposed in the clamping channel will contact the bottom wall 167a of the clamping channel along a line of contact 54c along the length of the fiber disposed within the clamping channel as shown in FIG. 5. Thus, when two splice elements are brought together, each optical fiber will have three lines of contact with the splice elements to reliably position and hold said optical fibers. In an exemplary aspect, the three lines of contact can be spaced relatively uniformly around the optical fiber.

Referring to FIGS. 4C and 5, the sloped channel walls of the alignment channels can be disposed at an angle relative to the bottom wall 165c of the alignment channel of between 45° and about 75°, preferably at an angle of about 60° relative to the bottom surface. The alignment channels can be characterized by a characteristic alignment channel width, w, between the lines of contact extending longitudinally along the sloped channel walls of the alignment channel where the optical fibers contact the alignment channel. In an exemplary aspect, the alignment channel width can be between about 85 microns and about 120 microns, preferably between about 95 microns and about 110 microns.

The clamping channels can be characterized by a characteristic clamping channel width, W, at the bottom 167c of the clamping channel. In embodiments where the characteristic clamping channel width is less than the diameter of the optical fiber to be disposed therein, the sidewalls 167a, 167b of the clamping channel are angled so they will not contact the optical fiber disposed therein.

In an exemplary aspect, the splice elements of the present invention can be formed using a sol casting resin to generate net shape silica ceramic parts, such as is disclosed in U.S. Provisional Patent Application Nos. 62/382,944 and 62/394,547, herein incorporated by reference in its entirety.

Fiber organizer 135, shown in FIGS. 7A-7D, is a multi-purpose element that provides for orderly insertion of the plurality of optical fibers into the splice element 160. The fiber organizer has a body portion 137 having a passage 136 extending therethrough to permit insertion of a plurality of optical fibers through the body of the fiber organizer. The body of the fiber organizer supports securing the plurality of optical fibers in a remote gripping region or pocket 137a of the fiber organizer so that the plurality of optical fibers can be firmly held in bare fiber holder 120. In this way, the fibers do not need to be attached to splice element 160 but are free to move axially within the alignment channels of the splice element. In one aspect, the remote gripping region includes a pocket 137a of the fiber organizer. A smaller slot or opening 137b can be formed opposite pocket 137a. Additional slots and openings (such as slots 137c, 137d shown in FIG. 7A) can also be provided in in the fiber organizer to accommodate features of the clamping mechanism, if needed. In one aspect, a mechanical clamp (not shown) can be utilized to secure an array of optical fibers within the fiber organizer. Alternatively, an adhesive, such as a fast-curing UV or visible light initiated adhesive or a thermally activated adhesive, such as a hot-melt material can be utilized to secure an array of optical fibers within the fiber organize.

Fiber organizer 135 includes a fiber comb portion 138 that is used to support, align and guide the optical fibers to be terminated. The fiber comb portion includes a top surface 138a (see FIG. 7B) and an array of grooves 138b (see FIGS. 4A-4C), located on the underside of the top surface, disposed on an end of the fiber organizer (nearest the splice element when assembled), with each individual groove or channel 138b configured to guide and support a single optical fiber of the fiber cable 50. The fiber comb portion also includes a ramp section 138c adjacent groove array 138b and disposed between the groove array and the main body portion of the fiber organizer. The ramp section includes gradual rising dividing structures 138d that separate the individual groove which can help align the individual fibers during the fiber insertion process. The structure of the fiber comb portion separates potentially tangled fibers, arranges the fiber array in a uniform pitch, and allows for straightforward feeding of the fiber array into the alignment channels of the splice element 160. In addition, the groove array/ramp structure of the fiber comb portion allows for precision placement of the fiber array with the naked eye.

Fiber organizer 135 also includes a rear portion having an opening (not shown) that allows for insertion of the fiber cable 50 into the fiber organizer passage 137. In one aspect, the rear portion includes extending support structures 135a and 135b (disposed opposite each other about the opening) that are configured to receive and support compression spring 122. The compression spring can fit over the support structure such that it rests against a rear side of the fiber organizer on one side of the compression spring and against the first housing portion on the opposite side of the compression spring. A contact bump or protrusion 135d can be formed on the rear portion of the fiber organizer to contact compression spring 122 and to center the force of the spring relative to the fiber organizer. Thus, when first fiber holder 120 is assembled, the compression spring 122 will be disposed between the fiber organizer 135 and the first housing portion 130.

Figure 8A:
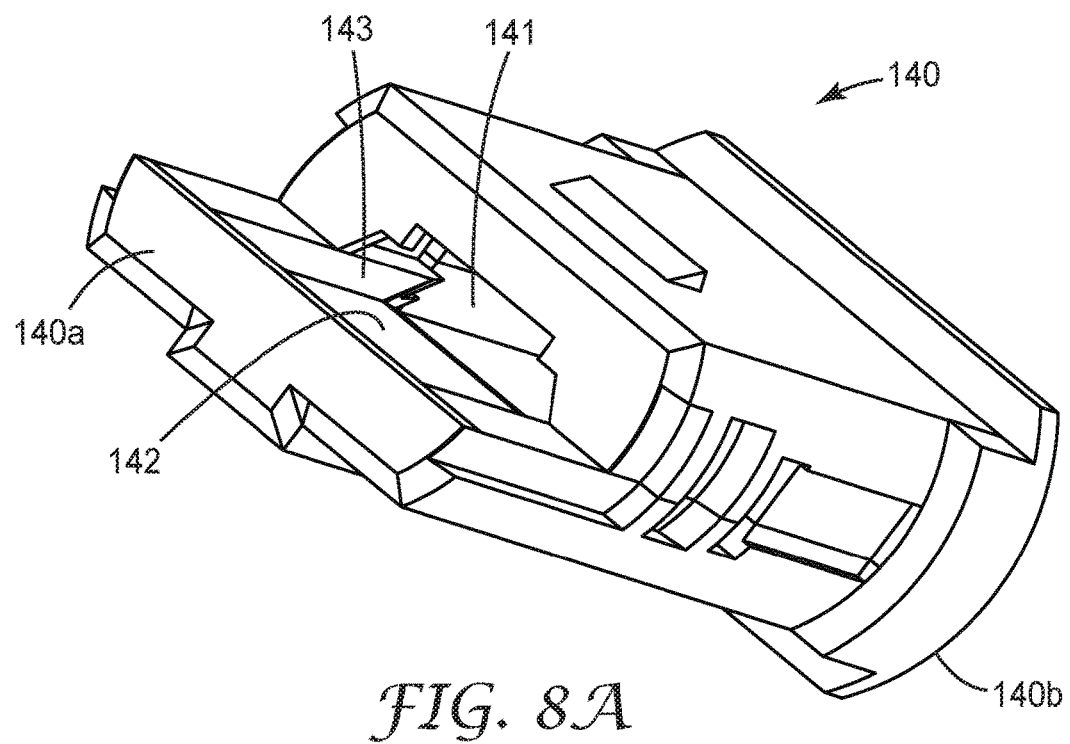
FIGS. 8A-8D are four views of the first housing portion of the fiber holder shown in FIGS. 2A-2C.
Figure 8B:
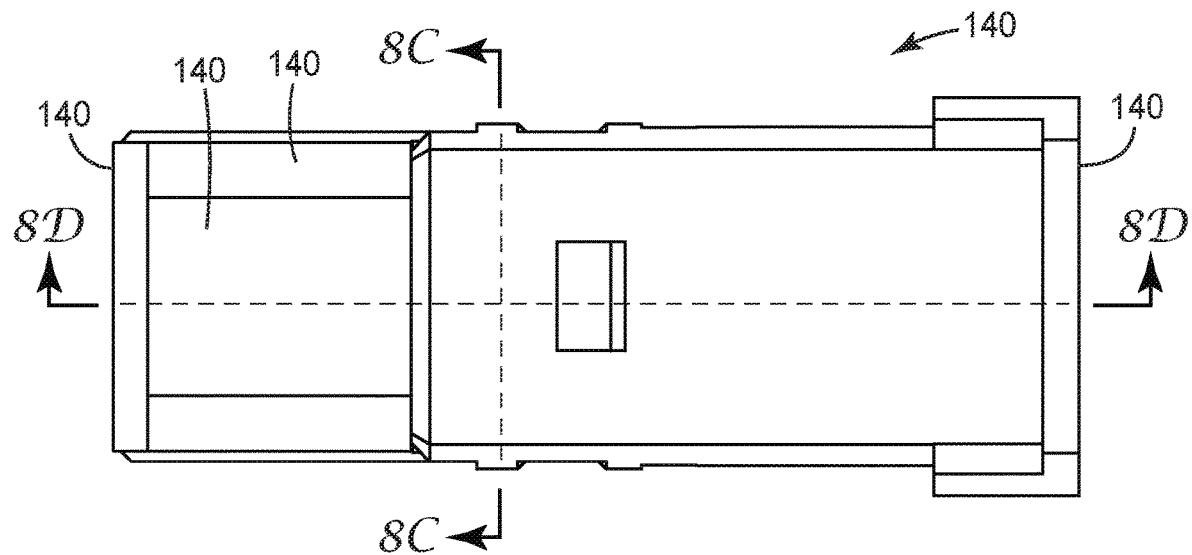
Figure 8C:
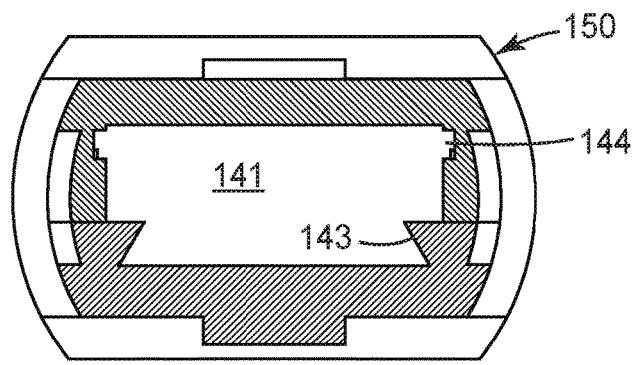
Figure 8D:
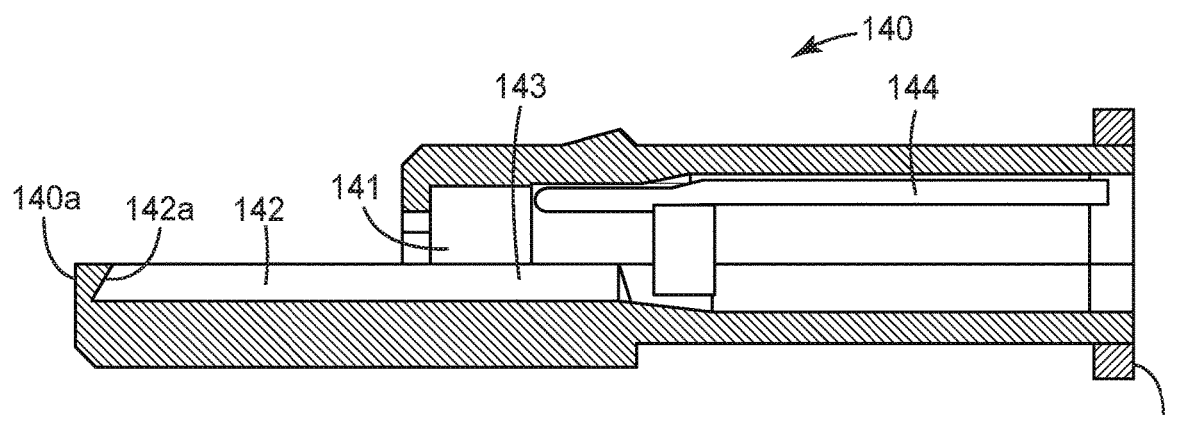

In an exemplary aspect, fiber organized 135 can include a guide pin or protrusion 139b extending from the sides of the fiber organizer to facilitate proper positioning of the fiber organizer in the second housing portion of the exemplary bare fiber holder. The guide pins fit into guide slots 144 formed in the interior side walls of the second housing portion 140 as illustrated in FIGS. 8D and 9A.

In addition, the fiber organizer may have one or more <-shaped notches 139a formed in the sides thereof that can be further used to guide and position the fiber guide within the second housing portion 140. The <-shaped notches 139a can be guided by inclined side walls 143 which help form the element receiving pocket 142.

According to an aspect of the present invention, fiber organizer 135 can be formed or molded from a polymer material, although metal and other suitable materials can also be utilized. For example, fiber organizer 135 can comprise an injection-molded, integral material. The choice of suitable materials for the fiber organizers can be made in accordance with the temperature stability parameters.

Referring again to FIGS. 4A and 4B, splice element 160 includes a rail 168 disposed along each longitudinal edge of splice body 161. Splice element 160 can include standoff features that provide a controlled vertical offset between two splice elements during at least a portion of the mating process. For example, a first plurality of optical fibers can be disposed in in the alternating alignment and clamping channels 165, 167 in first splice element 160 and a plurality of second optical fibers can be secured in the alternating alignment and clamping channels 165, 167 in a second inverted splice element 160. The optical connection is made by sliding the splice elements on the standoff features formed on one of the first and second splice elements until the standoff features fit into depressions formed in the surface of the other of splice elements. In the embodiment shown in FIGS. 4A-4B and 10A-10D, each rail 168 of the first and second splice elements can include a locking depression 168a and/or locking protrusion 168b. For example, splice element 160 includes a locking depression 168a and a locking protrusion 168b in each rail.

As mentioned previously in reference to FIGS. 3A and 3B the second bare fiber holder 120' is substantially similar to the first fiber holder 120 described above except with respect to the orientation of splice element 160 in the element receiving pocket 142. In FIG. 3A, the second end 160b of splice element 160 is disposed adjacent to the front wall 142a of the element receiving pocket 142, while in FIG. 3B, the first end 160a of splice element 160' is disposed adjacent to the front wall 142a of the element receiving pocket 142. Rotating the splice element in the element receiving pocket ensures proper alignment of the locking protrusions(s) and locking projections of bare fiber holders 120, 120' when they are mated together.

FIGS. 8A-8D illustrate the features of the second housing portion 140. Second housing portion 140 is a generally tubular structure having an interior cavity 141 configured to receive the internal components of the bare fiber holder (i.e. splice element 160, blocking element 150, intermediate spring 124 and fiber organizer 135) through its second end 140b and a stepped first or front end 140a having the splice element receiving pocket 142 formed therein. The splice element receiving pocket is formed by inclined side walls that are sloped at the same angle as the side walls 161c-161f. In particular, the element receiving pocket includes two inclined side walls 143 (FIGS. 8A and 8C) extending longitudinally along the length of the element receiving pocket and an inclined front wall 142a (FIG. 8D) disposed along the front end of the element receiving pocket adjacent to the first end of the second housing portion. FIG. 9A is a cross-sectional view of the second housing portion 140 showing the splice element 160 disposed in the element receiving pocket with the first end 160a disposed adjacent to the first end of the second housing portion with the inclined sidewall 161d of the splice element disposed against the incline front wall of the element receiving pocket.

Referring to FIGS. 6A-6B and 9A-9B, blocking element 150 is the next component which is inserted into the second housing portion 140 as shown in FIG. 9B. Blocking element 150 anchors the splice element 160 in the element receiving pocket by forming the fourth wall of the receiving pocket. Blocking element 150 includes a front side 150a, a back side 150b and an opening 152, to permit passage of a portion of the comb structure of the fiber organizer which is holding the optical fibers to be spliced by the connection system of the present invention. The front side of the blocking element includes a vertical wall portion 153a, a cutaway portion 153b and an angled wall portion 153c. The angled wall portion 153c is configured to push against inclined wall 161f of splice element 160 to ensure that it is pushed fully into the element receiving pocket 142 as shown in FIG. 9B. The cutaway portion will rest against the top surface of the splice to control the vertical position of the splice element in the element receiving pocket. In an exemplary aspect, blocking element 150 can include alignment slots 156 along either side 151 of the blocking element that are configured to engage with inclined sidewalls 143 of the element receiving pocket. The back side of the blocking element is a generally vertical surface that includes a pair of protrusions or bumps 155a, 155b located on a rear portion thereof that provides a point of contact with the intermediate spring and helps center the force applied by the intermediate spring element 124.

Figure 10A:
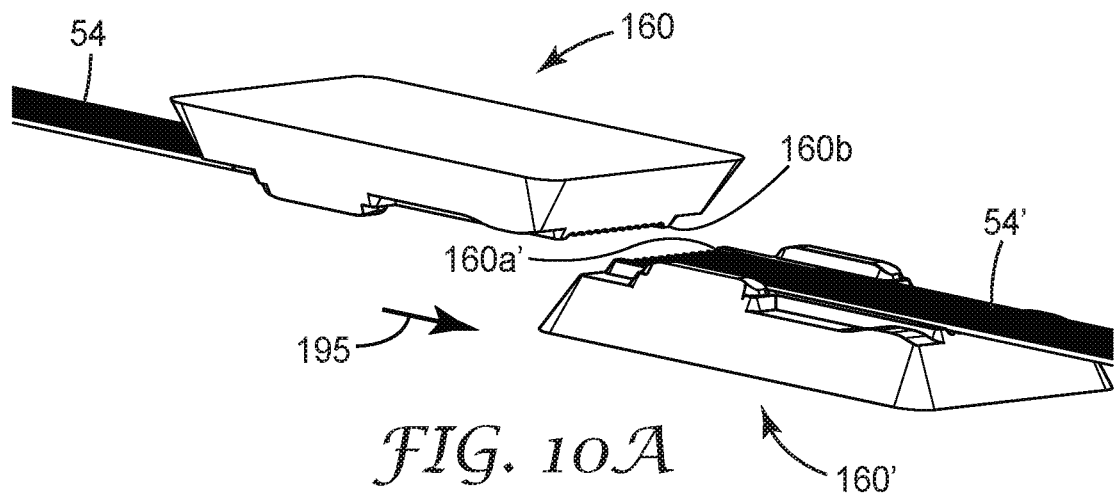
FIGS. 10A-10D are four views of the mating of a pair of splice elements of the embodiment shown in FIGS. 4A-4C.
Figure 10B:
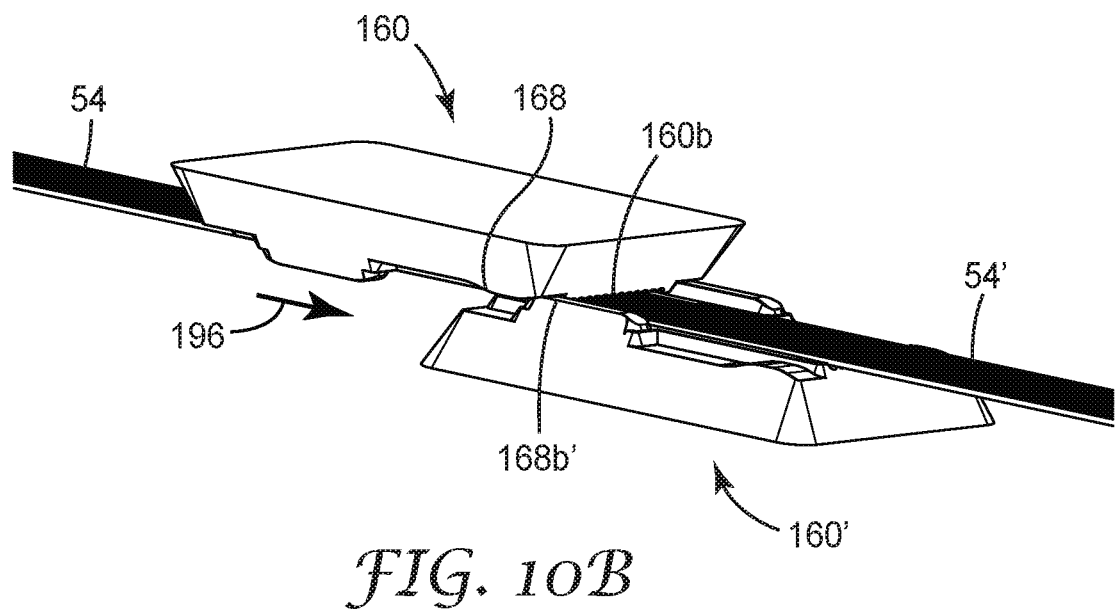
Figure 10C:
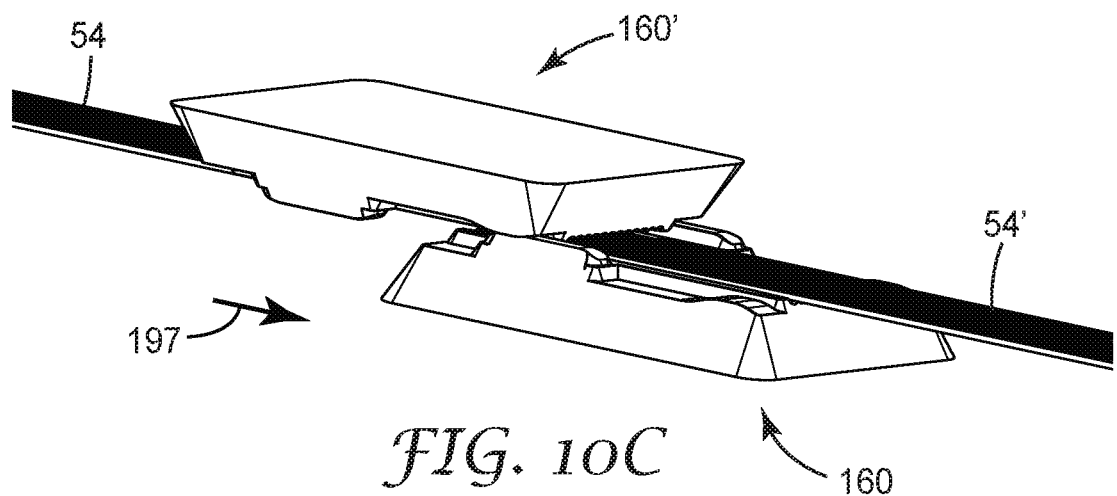
Figure 10D:
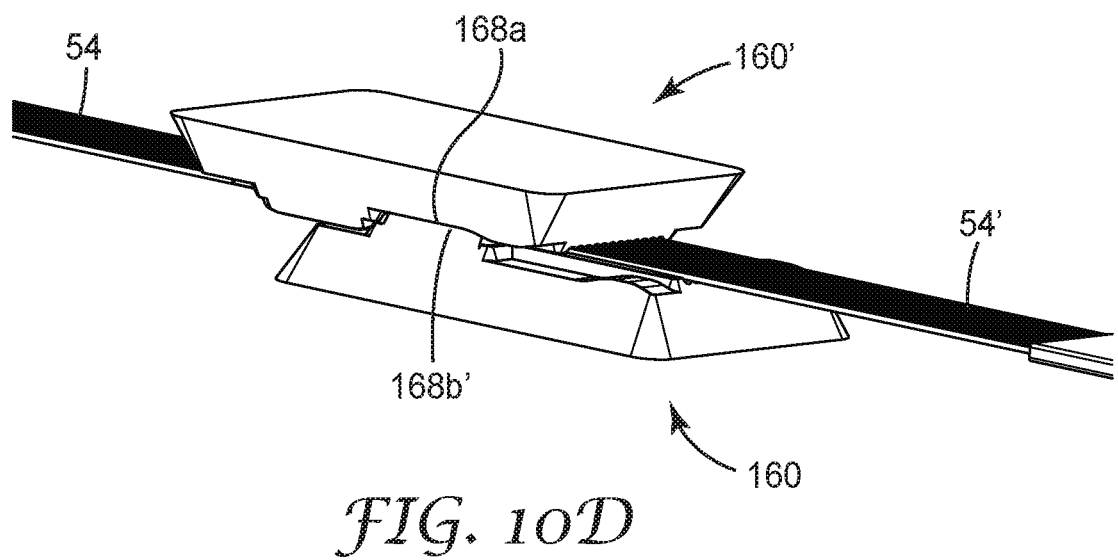

FIGS. 10A-10D illustrate the mating sequence for a pair of splice elements 160, 160' to optically connect a first and a second plurality of optical fibers 54, 54'. FIG. 10A shows splice elements 160, 160' moving toward each other in a forward and slightly downward direction as provided by directional arrow 195. FIG. 10B shows the splice elements at the point where the rail 168 at the second end 160b of splice element 160 contacts the locking protrusion 168b' of splice element 160'. Splice element 160 slides across the surface of the locking protrusion as indicted by directional arrows 196 and 197 as shown in FIGS. 10B and 10C. Splice element 160 continues to slide forward riding on the surface of the locking protrusion 168b' of splice element 160' until said locking element is seated in locking depression 168a of splice element 160 as shown in FIG. 10D.

A second embodiment of an exemplary optical fiber connection system is shown in FIGS. 11A-11E through 14A-14B. Optical fiber splice connection system 200 provides a ferrule-less interconnection system to optically couple a plurality of first and second optical fibers. Optical fiber splice connection system 200 comprises a pair of bare fiber holders, such as first and second bare fiber holders 220, 220'. In one aspect, the bare fiber holders may be secured together with an auxiliary clamping member (not shown) or by an adhesive. The first and second bare fiber holders 220, 220' be field terminated, installed or mounted onto an optical fiber cable or fiber ribbon in the field followed by assembly of the first and second bare fiber holders to form either a semi-permanent or permanent optical connection. Alternatively, the first and second bare fiber holders can be factory terminated, installed or mounted onto an optical fiber cable or fiber ribbon in the factory followed by assembly of the first and second bare fiber holders to form either a semi-permanent or permanent optical connection in the field.

Figure 12A:
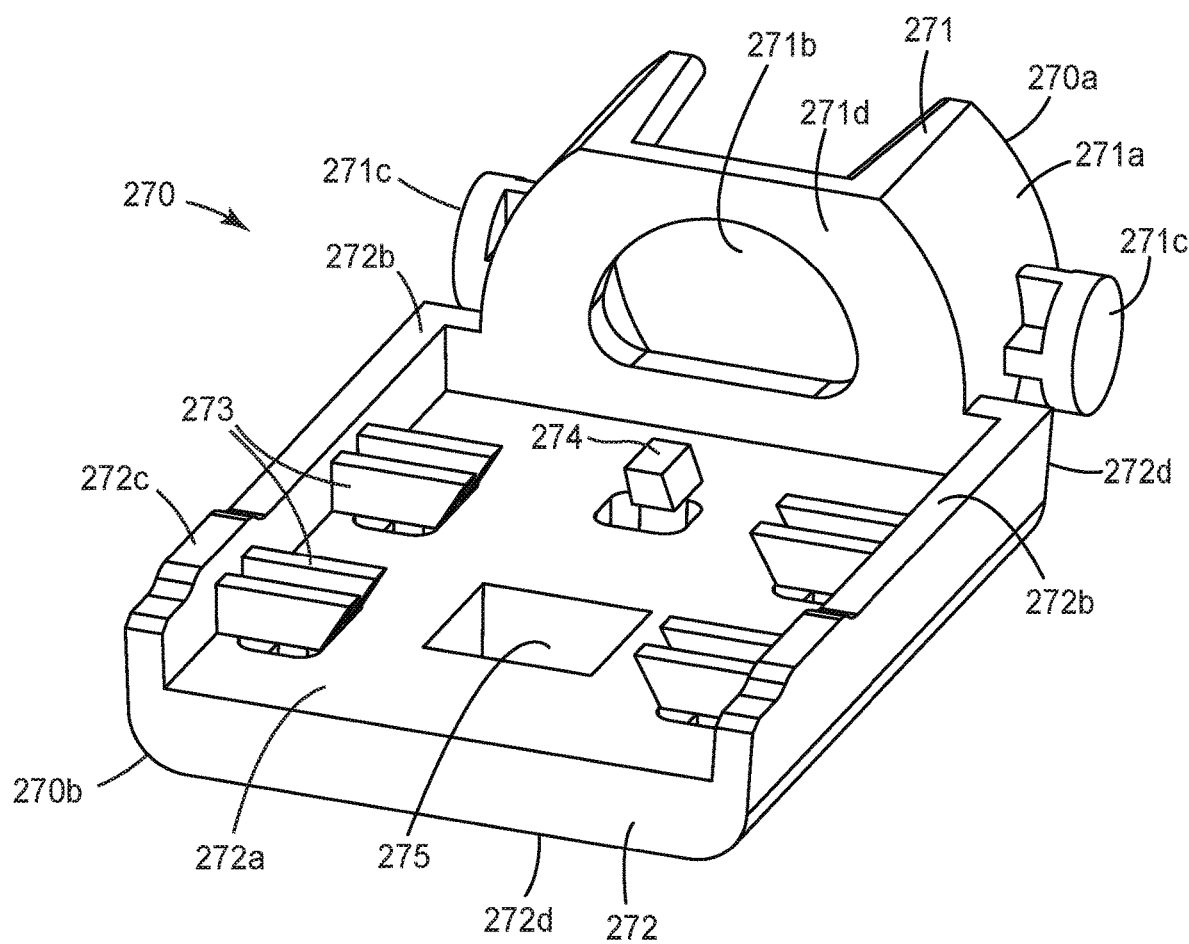
FIGS. 12A and 12B are two views of an element holder of the bare fiber holder of FIGS. 10A-10E.
Figure 12B:
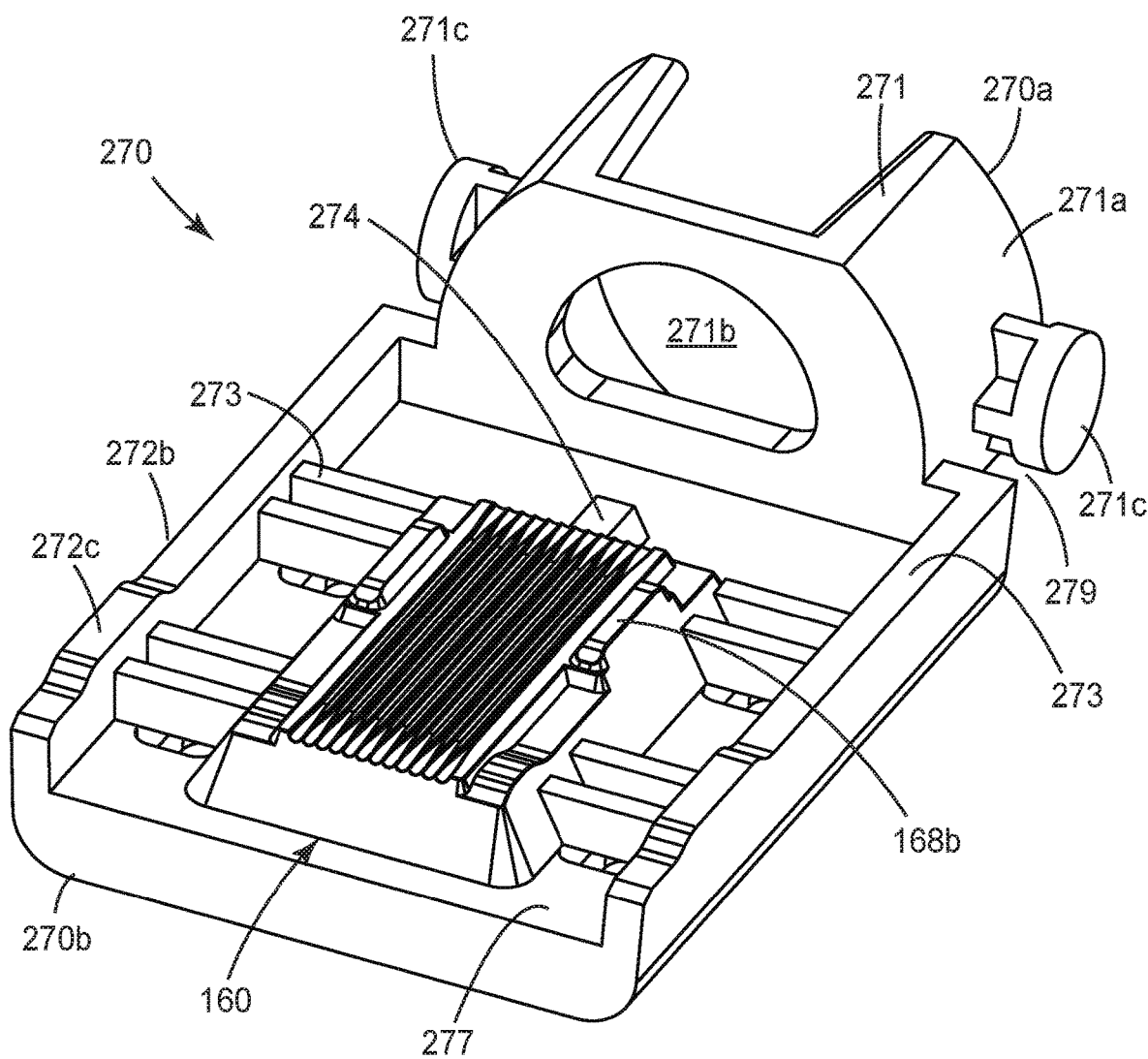
Figure 13A:
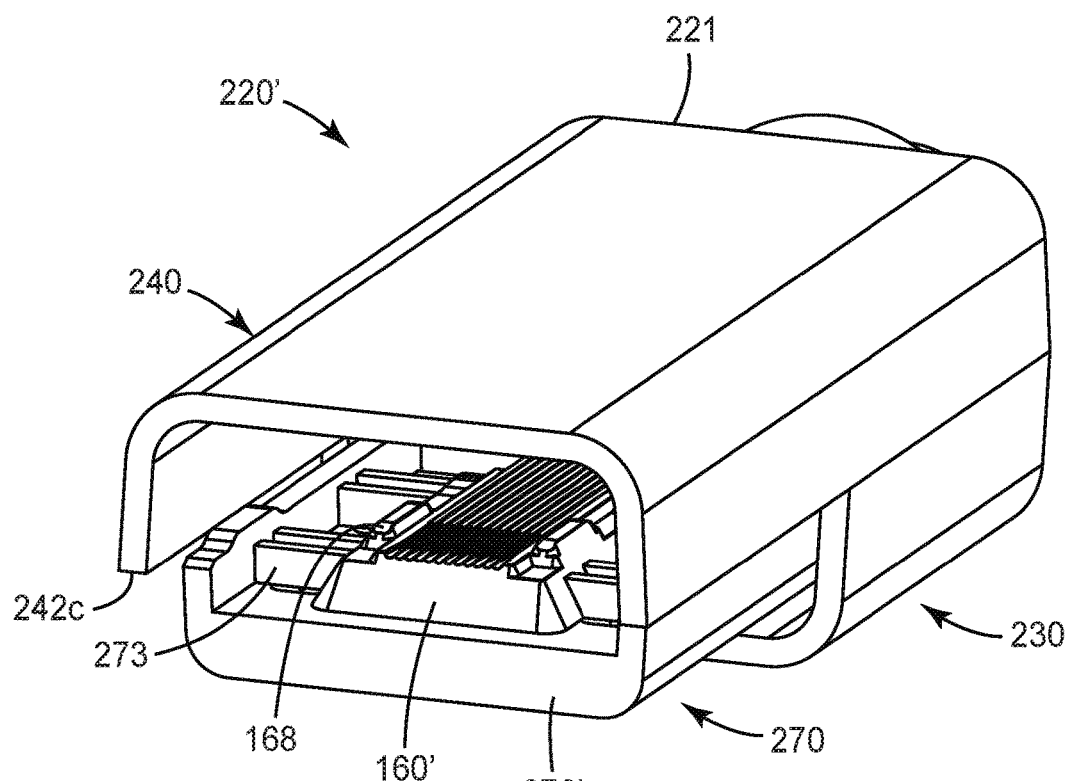
FIGS. 13A-13C are three views on a bare fiber holder that is configured to mate with the bare fiber holder of FIGS. 11A-11E to form the alternative optical fiber connection system according to an aspect of the invention.
Figure 13B:
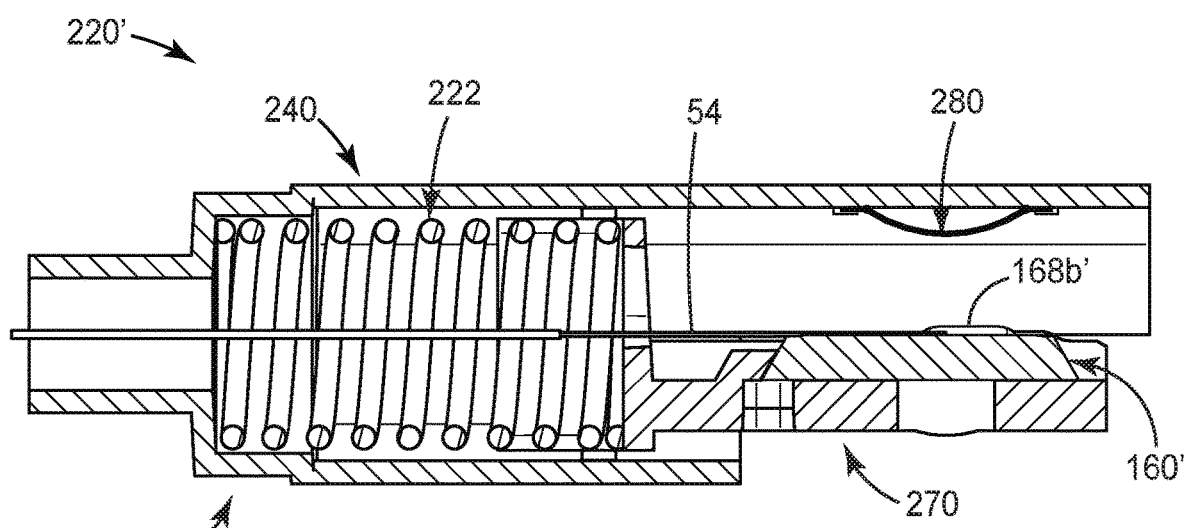
Figure 13C:
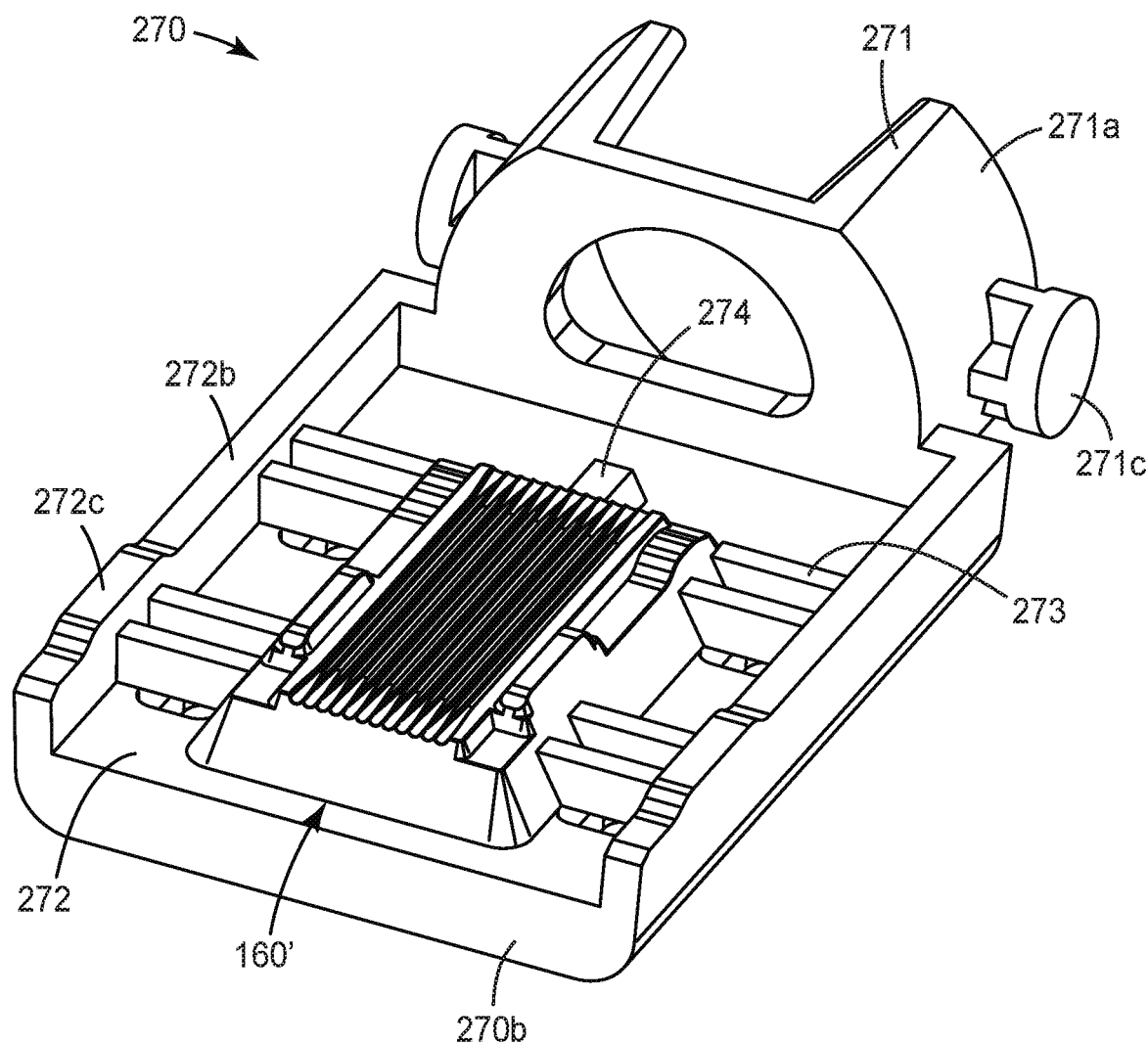

FIGS. 11A-11E illustrate the features and components of bare fiber holder 220. FIGS. 12A and 12B are detail views of the element platform 270 of bare fiber holder 220. FIGS. 13A-13C are three views on a bare fiber holder that is configured to mate with the bare fiber holder of FIGS. 11A-11E to form the alternative optical fiber connection system 200.

Bare fiber holder 220 has a first housing portion 230 and a second housing portion 240 that can be secured together to form the holder housing 221. Holder housing 221 is configured to arrange and hold the remaining components of the bare fiber holder and to protect the exposed bare glass portion 55 of the optical fibers 54 supported within the bare fiber holders. A crimp ring 229 can secure the first and second housing portions together. Optionally, additional latching features (not shown) can be added to further secure the first and second housings. Alternatively, the first and second housing portions can be adhesively bonded together, secured by a snap fit, or a latching system. In alternative embodiment, the holder housing can have a clam shell configuration having a first housing portion and a second housing portion that are joined by a living hinge. In the exemplary embodiment shown in FIGS. 11A-11E, each of the first and second housing 230, 240 can include a semi-cylindrical anchoring portion 233, 243 formed at their first ends 230a, 240a, respectively. The semi-cylindrical anchoring portion 233, 243 form a cylindrical anchoring portion 223 when the first and second housing portions are assembled to form the holder housing 221. A crimp ring 229 can be fitted over and secured to the cylindrical anchoring portion 223 to anchor the cable jacket or strength members an optical fiber cable to the bare fiber holder to enhance the cable retention strength in the bare fiber holder. In the exemplary aspect shown in FIG. 11A, the cylindrical anchoring portion has a smooth outer surface. In some embodiment, it can be desirable to add teeth or ribs to the outer surface of the cylindrical anchoring portion to further increase the retention force.

In an exemplary aspect, the first and second housing portions 230, 240 can have a generally open rectangular channel profile having a base 242a and a pair of parallel walls 242b extending from the base, the side walls having a top edge 242c extending along the length of the side walls. The top edge 232c of the first housing portion 230 is joined to a portion of the top edge 242c of the second housing portion 240 when the first and second housing portions are assembled to for the holder housing 201.

Optionally, a strain relief boot (not shown) can be mounted over the crimp ring to provide strain relief and bend control to an optical fibers or optical fiber cable at the point where the optical fibers enter the holder housing of the bare fiber holder.

Figure 11A:
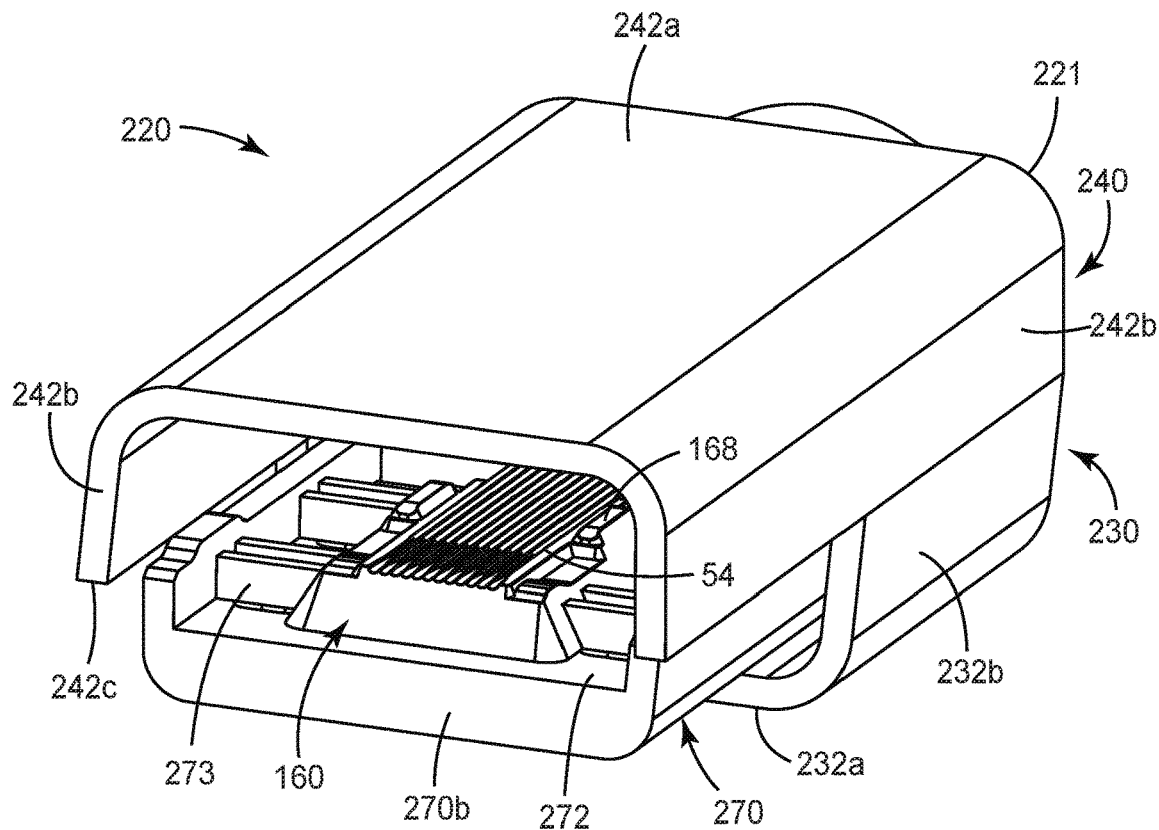
FIGS. 11A-11E are five views of a second embodiment of a bare fiber holder used in an alternative optical fiber connection system according to an aspect of the invention.
Figure 11B:
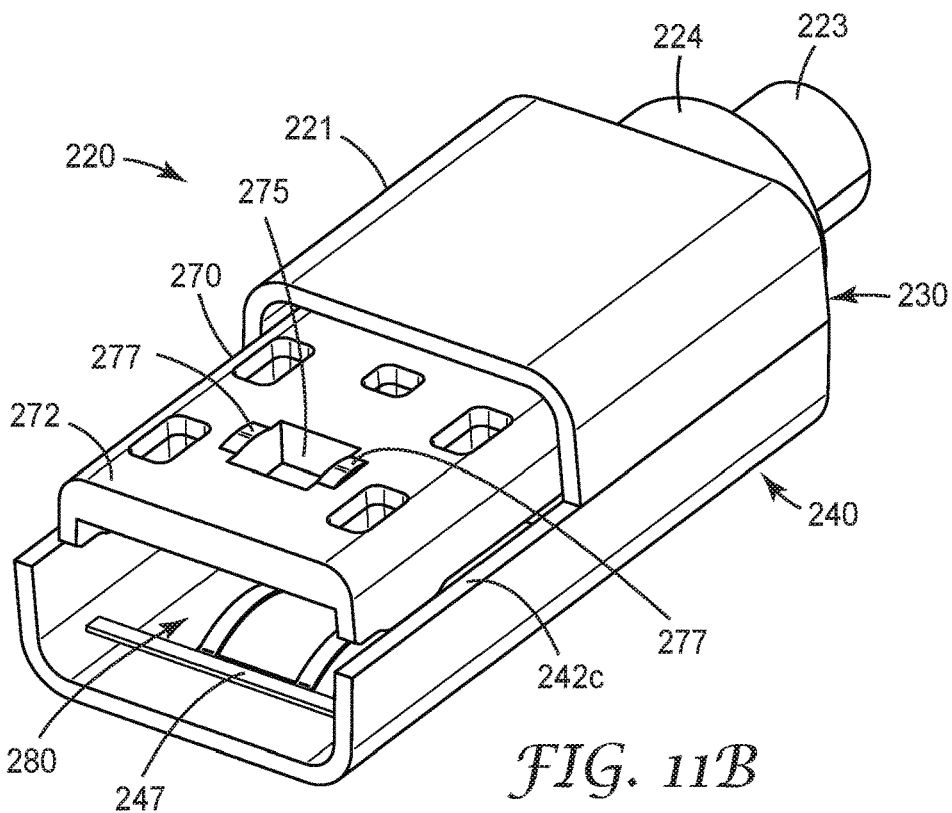
Figure 11C:
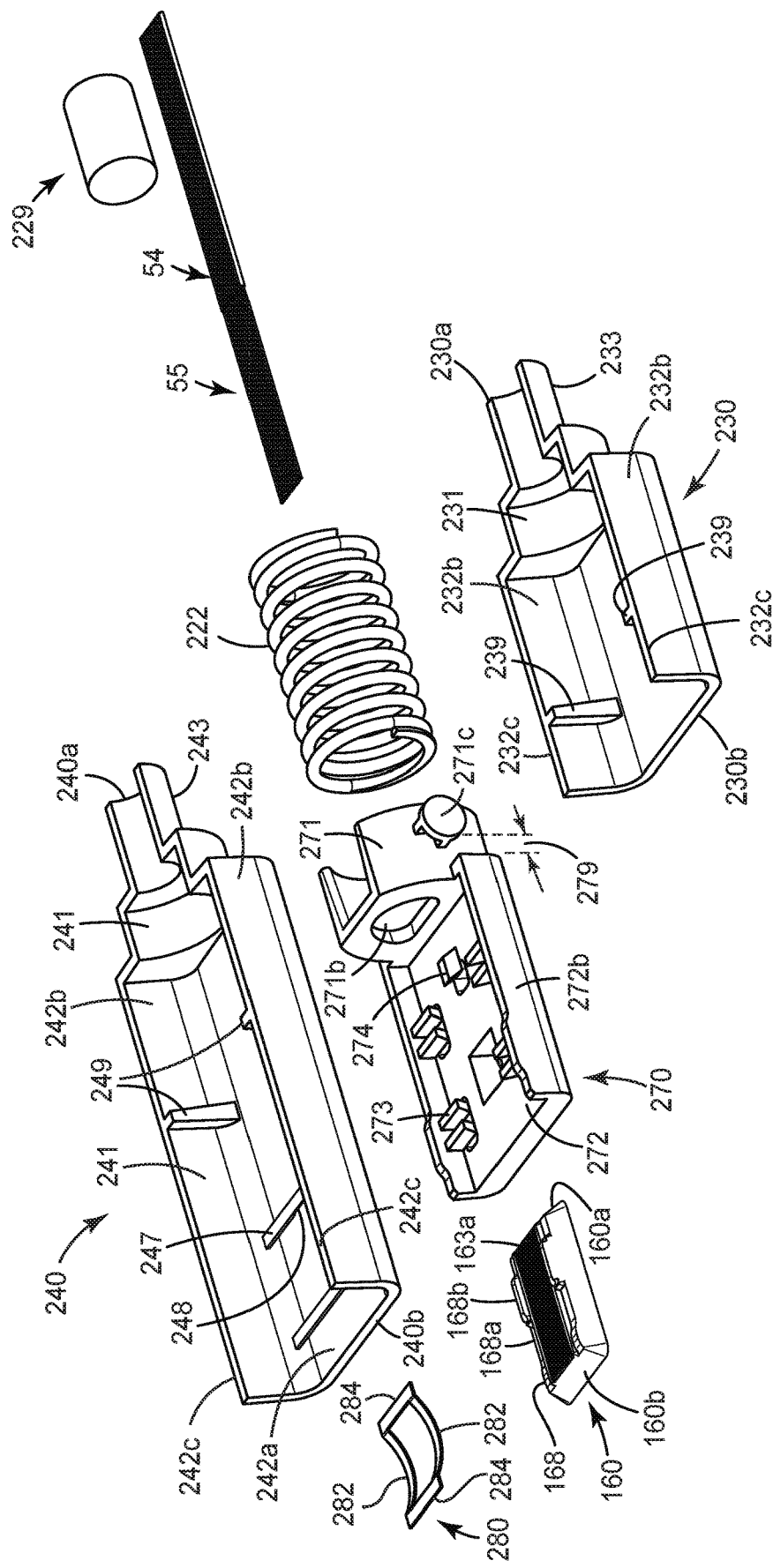
Figure 11D:
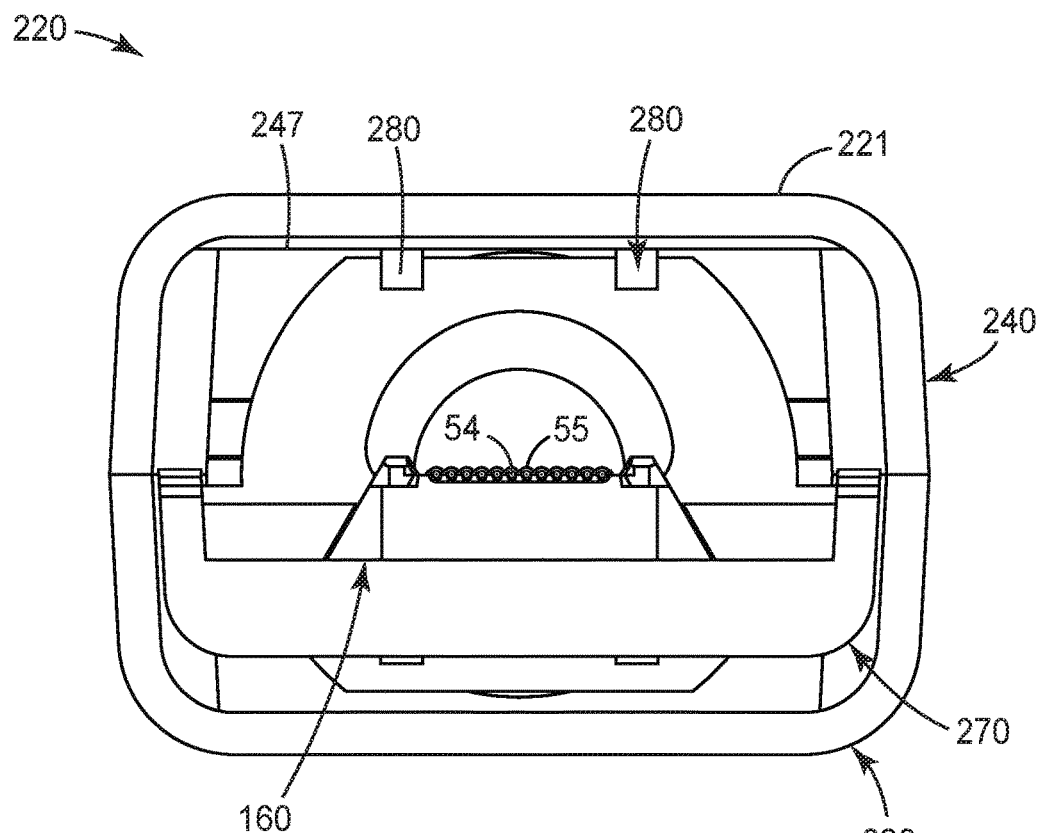
Figure 11E:
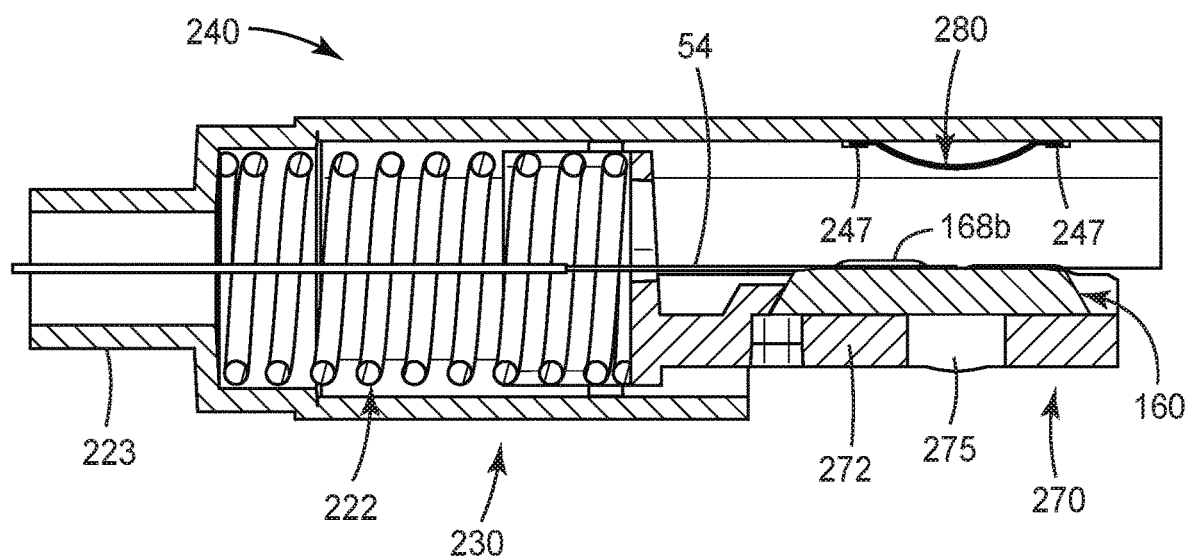
Figure 14A:
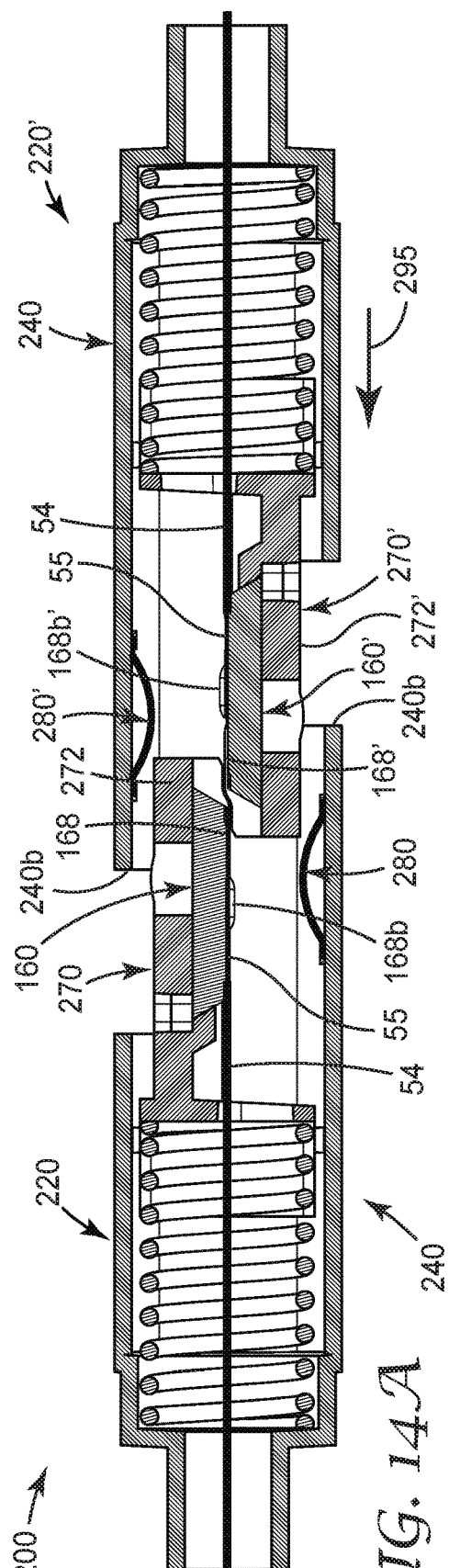
FIGS. 14A and 14B are two views of the assembled alternative optical fiber connection system according to an aspect of the invention.
Figure 14B:
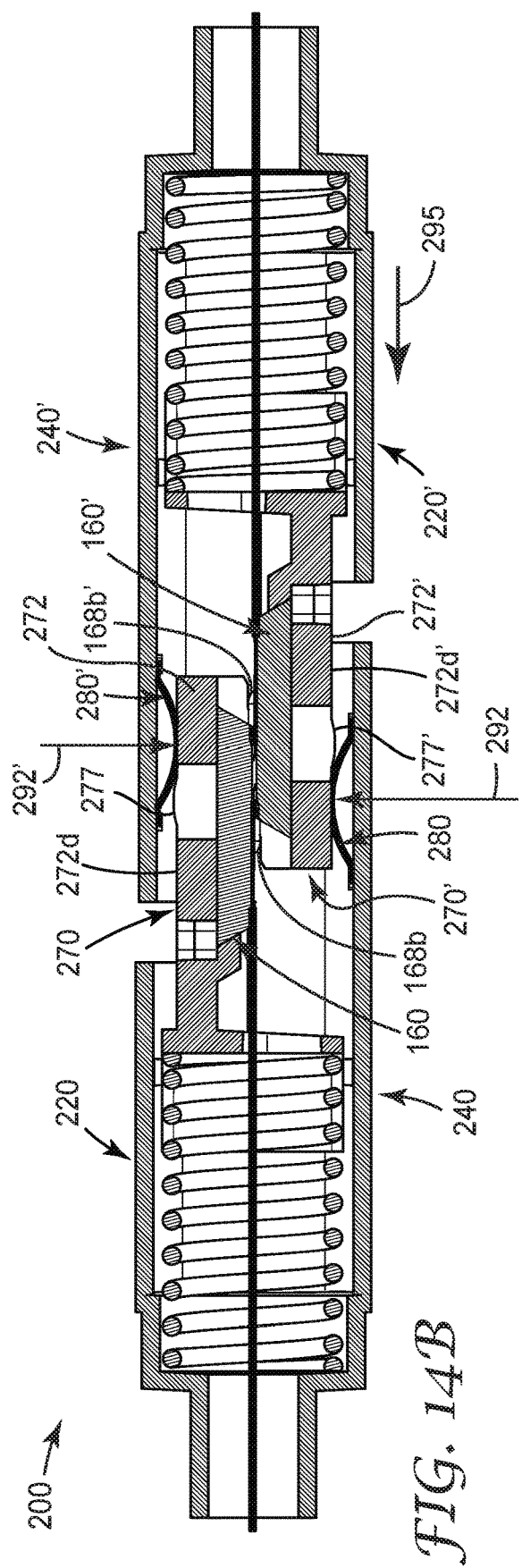

Referring to FIGS. 11C, 11E and 14B, a leaf spring 280 can be attached to second housing portion 240 of bare fiber holder 220 to provide a vertical mating force (represented by directional arrow 292 in FIG. 14B) on a bottom surface 272d' of element platform 270' of a mating bare fiber holder 220'. Similarly, leaf spring 280' attached to second housing portion 240' of bare fiber holder 220' provides a vertical mating force (represented by directional arrow 292' in FIG. 14B) on a bottom surface 272d of element platform 270 of a mating bare fiber holder 220. The combination of the vertical mating forces 292, 292' ensures the vertical alignment of the ends of the first and second optical fibers, while the sloped walls of the alignment channels in the splice elements 160, 160' provide the lateral alignment of the optical fibers.

In an exemplary aspect, the second housing 240 can include a pair of spaced apart anchor bars 247 formed on the interior surface 241 of the second housing portion. Leaf spring 280 can be fitted into a slot 248 formed in the anchor bars to secure the leaf spring to the second housing portion. The leaf spring can have a generally arched profile comprising two arched arms 282 connected at both ends by a flat footer portion 284. The footer portion fits into the slot formed in the anchor bars to secure the leaf spring to the second housing portion. In an exemplary aspect, the leaf spring can be stamped from a piece of spring steel and formed into the leaf spring as shown in FIG. 11C.

Bare fiber holder 220 further comprises a fiber alignment mechanism or splice element 160 that is held by an element platform 270 in a first orientation. In the exemplary aspect shown in FIGS. 11A, 11C and 12B, splice element 160 is the same splice element used in bare fiber holder 120 described previously. In this embodiment, the optical fibers can be secured directly to splice element 160 using an adhesive. For example, an adhesive such as a fast-curing UV or visible light initiated adhesive or a thermally activated adhesive, such as a hot-melt material can be utilized to secure an array of optical fibers within the entrance openings 163a of the splice element. Securing the optical fibers in this area of the splice element still provides the advantages of remote gripping the optical fibers, but without the need for a separate fiber organizer such as that provided in bare fiber holder 120, described above in reference to FIGS. 2A-2C.

Element platform 270 includes a collar portion 271 which is attached to an element stage 272. Collar portion 271 can have a generally cylindrical shape that is configured to receive a portion of a compression spring 222. As shown in FIG. 12A, the collar portion can have an opening 271b through an end wall portion 271d where the element stage attaches to the collar portion. The opening permits passage of the optical fibers through the end wall of the collar portion element platform.

Element stage 272 has a base and sidewalls 272b extending from the base. The side walls extend along the longitudinal edges of the base from a second end 270b of the element platform to the collar portion 271. The base has a top surface 272a and a bottom surface 272d. Splice element 160 is anchored to the top surface by element catches 273, 274. In an exemplary aspect, the sidewalls can include a protrusion or bump 272c formed on the top of the sidewalls 272b to control the vertical offset between the splice elements held on the element platform during the mating of a pair of bare fiber holders 220.

In an exemplary aspect, element stage 272 can include a window 275 that extends through the base of the element stage under the interconnection area on the splice element 160 where the first and second optical fibers are joined end-to-end (see FIG. 11E). In an exemplary aspect, a pair of bare fiber holders 220 can be permanently joined together by an index matched optical adhesive. An exemplary optical adhesive can be cured with actinic radiation via a rapid and straightforward procedure using an eye-safe visible, e.g., blue, LED light source such as is described in U.S. patent application Ser. No. 15/695,842, herein incorporated by reference in its entirety. The curing radiation can be shined on the adhesive through at least one of the exemplary splice elements through window 275.

Collar portion 271 can also include a pall 271c that extends from the outer surface 271a of the collar portion either side of the collar portion. A translation gap 279 is formed between the pall and the end 272d of the sidewall 272b. Tapered ridges 239, 249 disposed on the interior surface of the first and second housing portions 230, 240 form a track that fits in gap 279 to control the relative position of the element platform when two of the exemplary bare fiber holders 220 are mated together.

The element platform 270 can be resiliently mounted in the holder housing 221. In an exemplary aspect, a compression spring 222 can be disposed between the holder housing 221 and the element platform that applies a forward force (represented by directional arrows 295 in FIG. 14B) on the element platform and the splice element disposed thereon. For example, the holder housing can comprise a spring seating area 224 that is formed when the first and second housing portions 230, 240 are assembled together.

Using this configuration, optical fiber connection system 200 can utilize the spring forces of the fiber array, and the main compression spring to achieve a force balance to create a reliable dry splice interface (no optical coupling material or index matching gel or adhesive) in the optical path in conjunction with fiber end face shaping techniques known in the industry.

FIGS. 13A-13C show the second bare fiber holder 220' that is configured to mate with the bare fiber holder 220 of FIGS. 11A-11E to form the alternative optical fiber connection system 200. The structure of the first and second bare fiber holders is essentially the same apart from the orientation of the splice element 160 disposed on element platform 270. In second bare fiber holder 220', the second end of splice element 160 abuts against element catch 274 on the element stage. When the splice element is in this orientation, the splice element will be referred to as splice element 160' and the bare fiber splice holder is referred to as second splice holder 120'. Otherwise the first and second splice holders are structurally equivalent.

FIGS. 14A and 14B are two cross-sectional views showing the mating of two bare fiber holders 220, 220' of optical fiber splice connection system 200. FIG. 14A illustrate the bare fiber holders 220, 220' at the beginning of the mating process. The bare fiber holders 220, 220' are brought together until the top edge at the second ends 240b, 240b' of the second housing 240, 240' contact each other. As bare fiber holder 220' moves toward bare fiber holder 220, as indicated by directional arrow 295, element stage 272' of bare fiber holder 220' enters the space between stage element stage 272 of bare fiber holder 220 and the second housing 240. Similarly, the element stage 272 of bare fiber holder 220 enters the space between stage element stage 272' of bare fiber holder 220' and the second housing 240' at the same time.

As bare fiber holder 220' continues to move toward bare fiber holder 220, the cam surface of the locking protrusions 168b, 168b' and the rails 168', 168 engage to roughly align the height of the splice elements 160, 160' with respect to one another. FIG. 14B shows the initial engagement between the rails (not shown) and the locking protrusions 168b, 168b'. As this occurs, leaf spring 280, 280' begins to apply a vertical force to the back surface 272d, 272d' of the element stages 272 pushing splice elements 160, 160' toward each other. The vertical force increases as the leaf spring contact the camming feature 277 (best seen in FIG. 11B) on the bottom surface of the element stage, up to 3.5-4.5 lbs. Once the bare fiber holders 220, 220' are fully mated. The leaf springs 280, 280' continue to apply the vertical force to element holders 270', 270 and in turn the splice elements 160' 160. The vertical force is centered on the point where the first and second optical fibers 54, 54' meet to secure and align the fibers in the alignment channels of the splice elements.

Provided that the second housing portion is made of a transparent or semi-transparent material, it may be desirable to permanently secure, the first and second bare fiber holders 120, 120', 220, 220' can be permanently secured together with an optical adhesive such as the optical adhesive described in U.S. patent application Ser. No. 15/696,901.

Alternatively, the first and second bare fiber holders can be semi-permanently secured together via a mechanical clamping element, such as clamping element 110, in either a dry state or using an index patching material disposed between the terminal ends of the optical fiber arrays being joined in the exemplary an optical fiber splice connection system 100 exemplified by FIGS. 1-10 as provided above.

An exemplary connection made in accordance with the present disclosure should have an insertion loss of less than 0.1 dB, a return loss variation of less than 5 dB when temperature cycled from −10° C. to +75° C. and have a pullout strength of greater than 0.45 $lb_f$.

The exemplary optical fiber connection system can be used in a wide range of applications where low loss optical connections are needed, especially when the connections are semi-permanent or permanent. In some embodiments, the exemplary multifiber devices can be used in fiber optic cassettes, terminals, patch panels, etc. where the splice can be located at a bulkhead or through the wall of an enclosure.

For example, the exemplary connection system can be used in an optical cassette, such as is described in U.S. Provisional Patent Application No. 62/544,370, herein incorporated by reference, wherein the optical cassette or terminal comprises an enclosure having a top, a bottom and a plurality of side walls disposed between the top and the bottom, and at least one exemplary connection system of the present disclosure disposed through one of the plurality of sidewalls. A plurality signal paths can exit the cassette or through one of the plurality of sidewalls wherein the plurality signal paths can comprise a connection point at the sidewall where the plurality signal paths exit the cassette. The exemplary optical fiber connection system of the present disclosure can be used for the multifiber connection device and/or for the single fiber connection points. In an exemplary use in which the cassette or terminal can comprise a plurality of paired single fiber connection points, such that the first of the pair of single fiber connection points is designated as a transmit port and the second of the pair of single fiber connection points is designated as a receive port. In this aspect, signals carried by the plurality of outside optical fibers can be reordered within the cassette or terminal such that the signals leaving the cassette are in a different order than they enter the cassette. In some embodiments, this reordering of the signal paths is used to manage the polarity of the send and receive ports.

In an alternative application, the exemplary optical fiber connection system can be used to make an optical fiber harness assembly. For example, in the exemplary optical fiber connection system may be used to directly connect fiber fanout to a continuous transmission portion or cable in either the field or in the factory. This can be especially advantageous when the fanout portion is made in a first location, the transmission portion is made at a second location and where the fanout portion to a continuous transmission portion are brought together at a third location.

Various modifications, equivalent processes, as well as numerous structures to which the present invention may be applicable will be readily apparent to those of skill in the art to which the present invention is directed upon review of the present specification.

We claim:

1. A splice element used to interconnect a first plurality of optical fibers to a second plurality of optical fibers, the splice element comprising:
   a splice body having a plurality of alternating alignment and clamping channels formed in a top surface of splice body, wherein the alignment channels include sloped channel walls, wherein each of the sloped channel walls touches the optical fibers along a line of contact and wherein the clamping channel is configured to contact the optical fibers disposed therein along the bottom wall of the clamping channel.

2. The splice element of claim 1, wherein fibers disposed in the alignment channels contact each of the sloped channel walls at a line of contact that extends longitudinally along the length of the alignment channel.

3. The splice element of claim 2, wherein the alignment channels are characterized by a characteristic alignment channel width extending between the line of contact on each of the sloped channel walls.

4. The splice element of claim 3, wherein the characteristic alignment channel width can be between about 60 microns and about 110 microns.

5. The splice element of claim 1, wherein the clamping channels are characterized by a characteristic clamping channel width, W, at the bottom of the clamping channel.

6. The splice element of claim 5, wherein the clamping channel width is greater than 110 microns.

7. The splice element of claim 1, wherein each of the plurality of alternating alignment and clamping channels includes a funnel shaped entrance opening.

8. The splice element of claim 7, wherein the entrance openings are characterized by an interchannel pitch between centerlines of an alignment channel and a centerline of an adjacent clamping channel.

9. The splice element of claim 8, wherein the interchannel pitch at the first end of the splice element is the same as the interchannel pitch at the second end of the splice element.

10. The splice element of claim 1, further comprising a rail disposed along each longitudinal edge of splice body that includes one of a locking depression and a locking protrusion that is configured to mate with a corresponding feature when assembled together with a second exemplary splice element.

* * * * *